Sept. 8, 1942.　　　　W. S. CLOUD　　　　2,295,335
PROCESS AND APPARATUS FOR PACKAGING ARTICLES
Filed Aug. 3, 1940　　　13 Sheets-Sheet 1
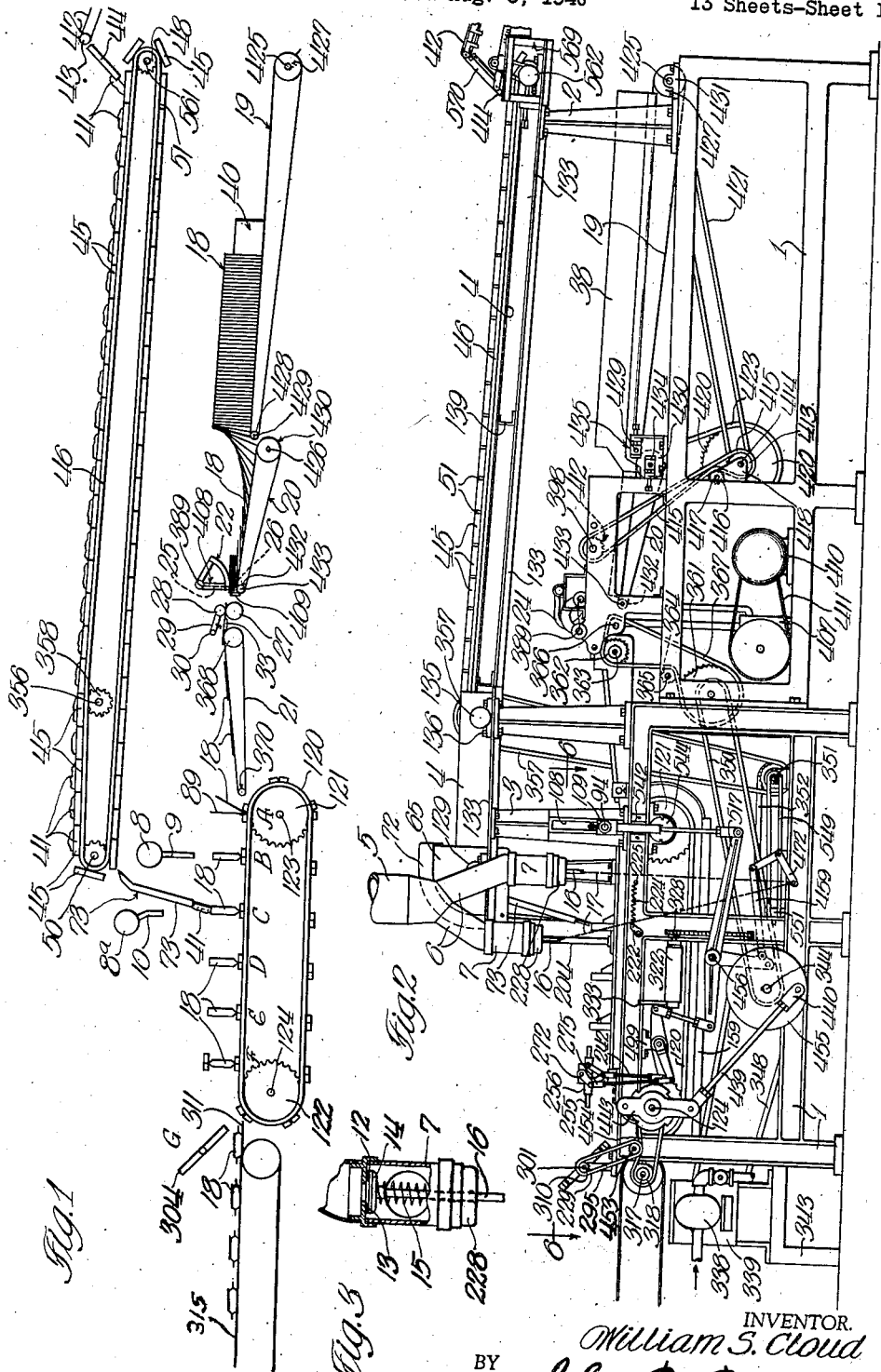
INVENTOR.
William S. Cloud
BY John R. Porter
ATTORNEY.

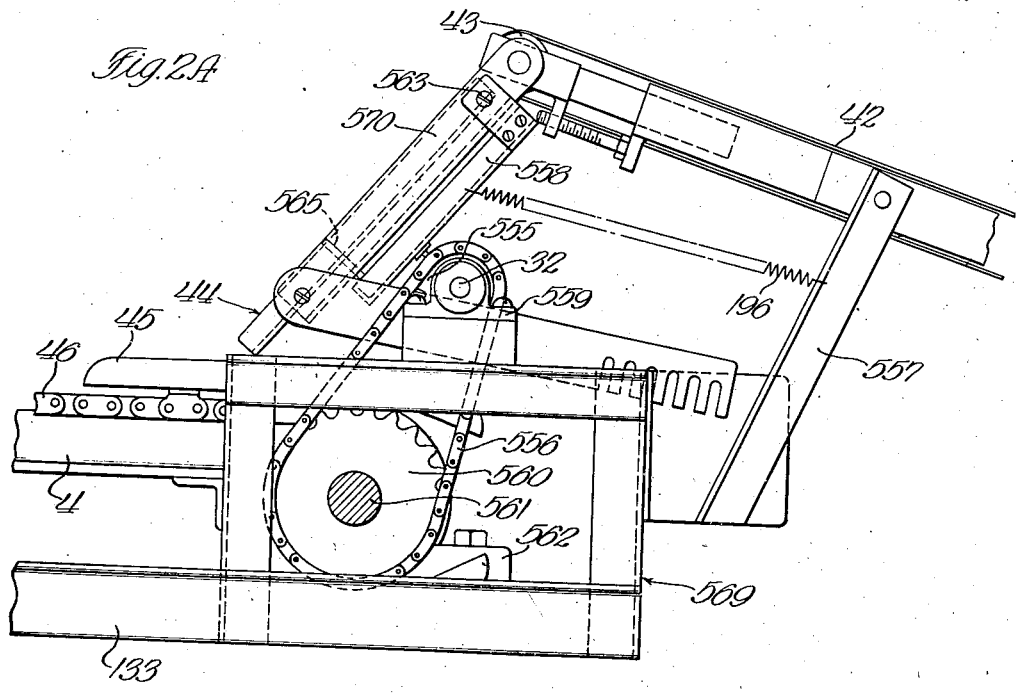
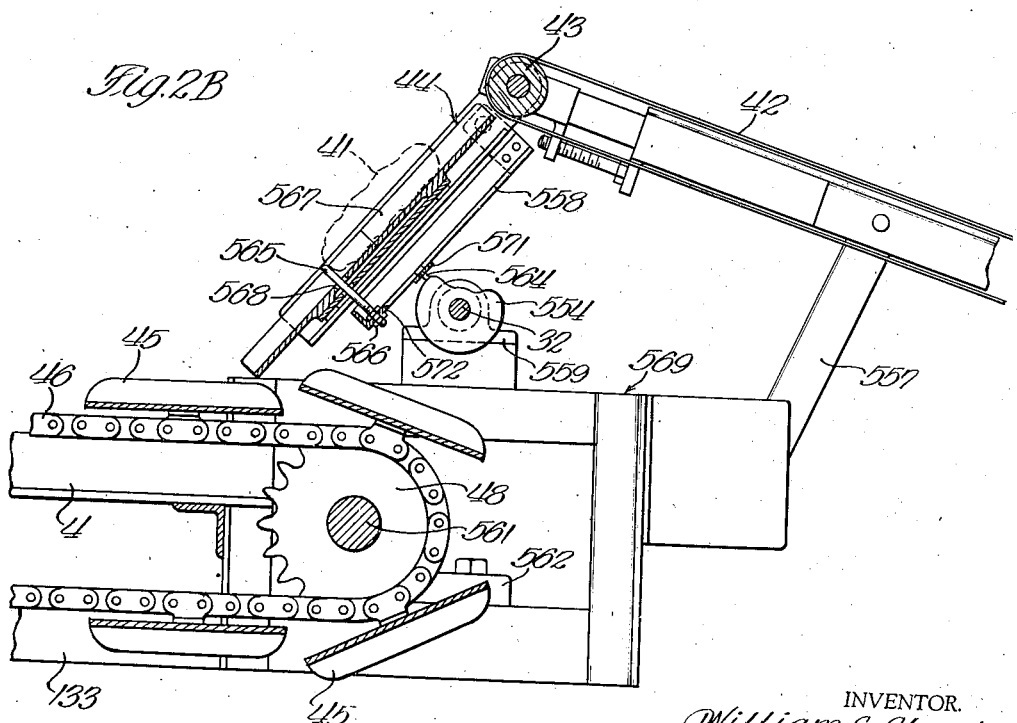

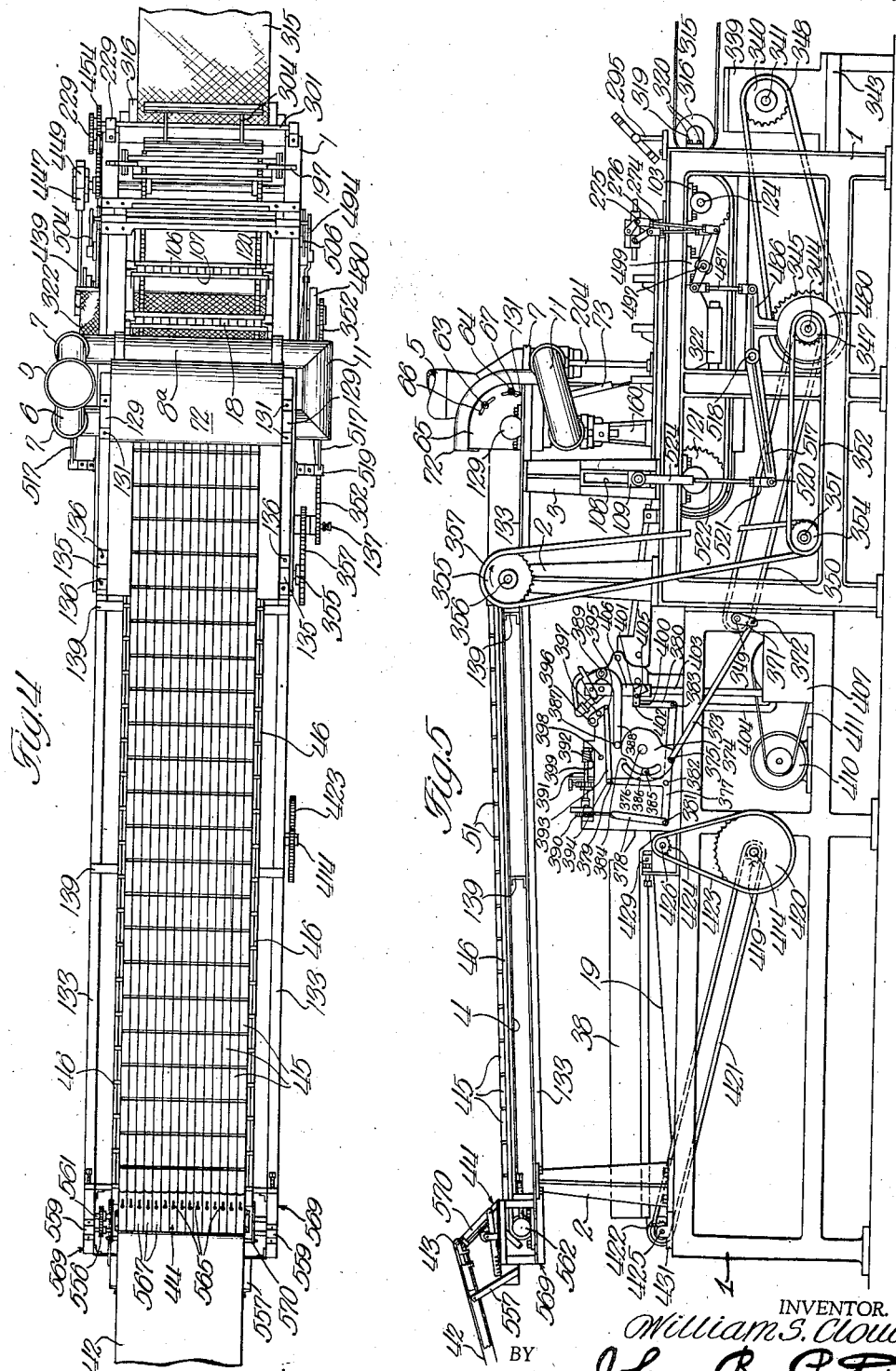

Sept. 8, 1942. W. S. CLOUD 2,295,335
PROCESS AND APPARATUS FOR PACKAGING ARTICLES
Filed Aug. 3, 1940 13 Sheets-Sheet 4
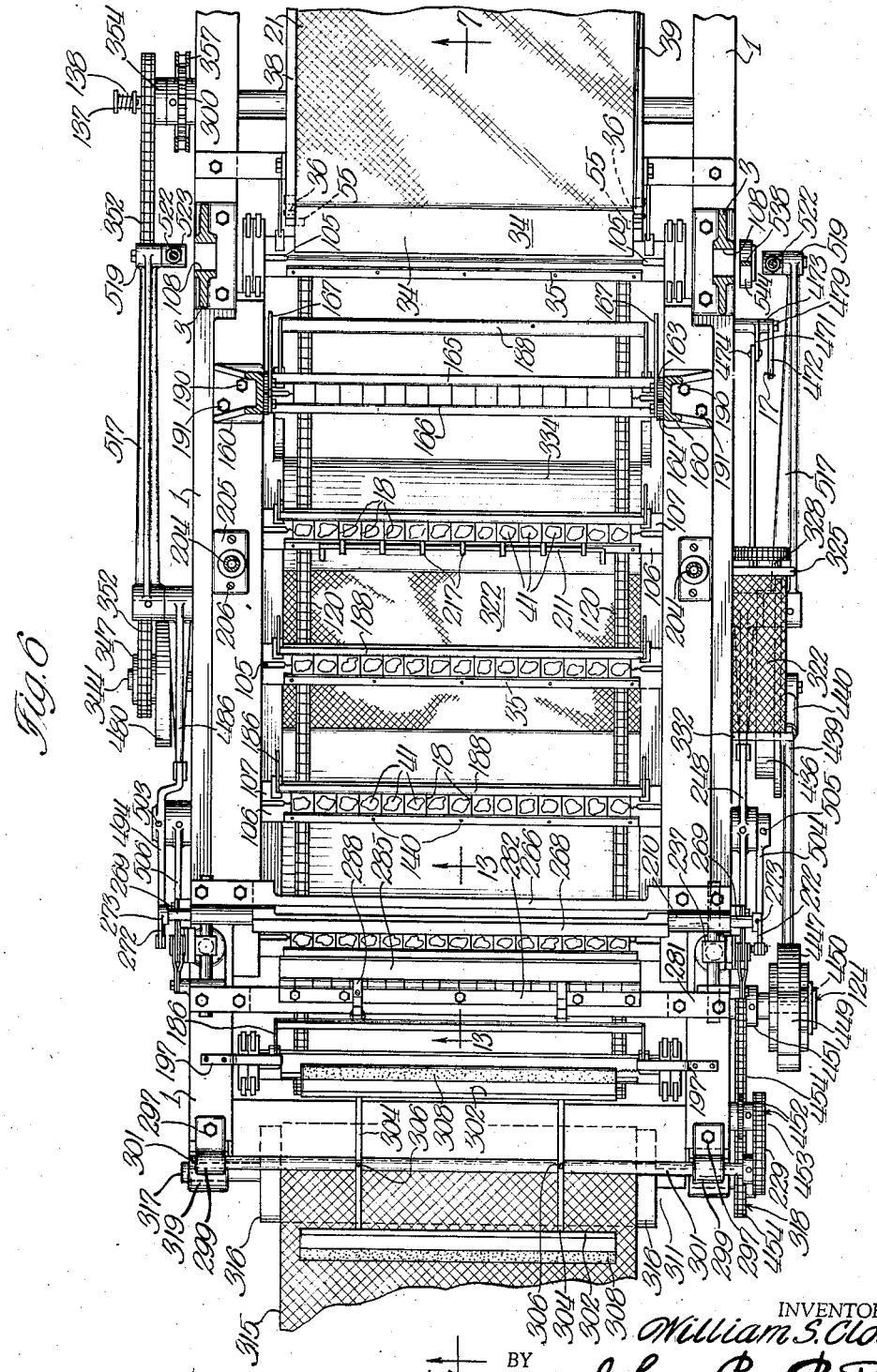
INVENTOR.
William S. Cloud
BY John R. Porter
ATTORNEY.

Sept. 8, 1942.  W. S. CLOUD  2,295,335
PROCESS AND APPARATUS FOR PACKAGING ARTICLES
Filed Aug. 3, 1940  13 Sheets-Sheet 5
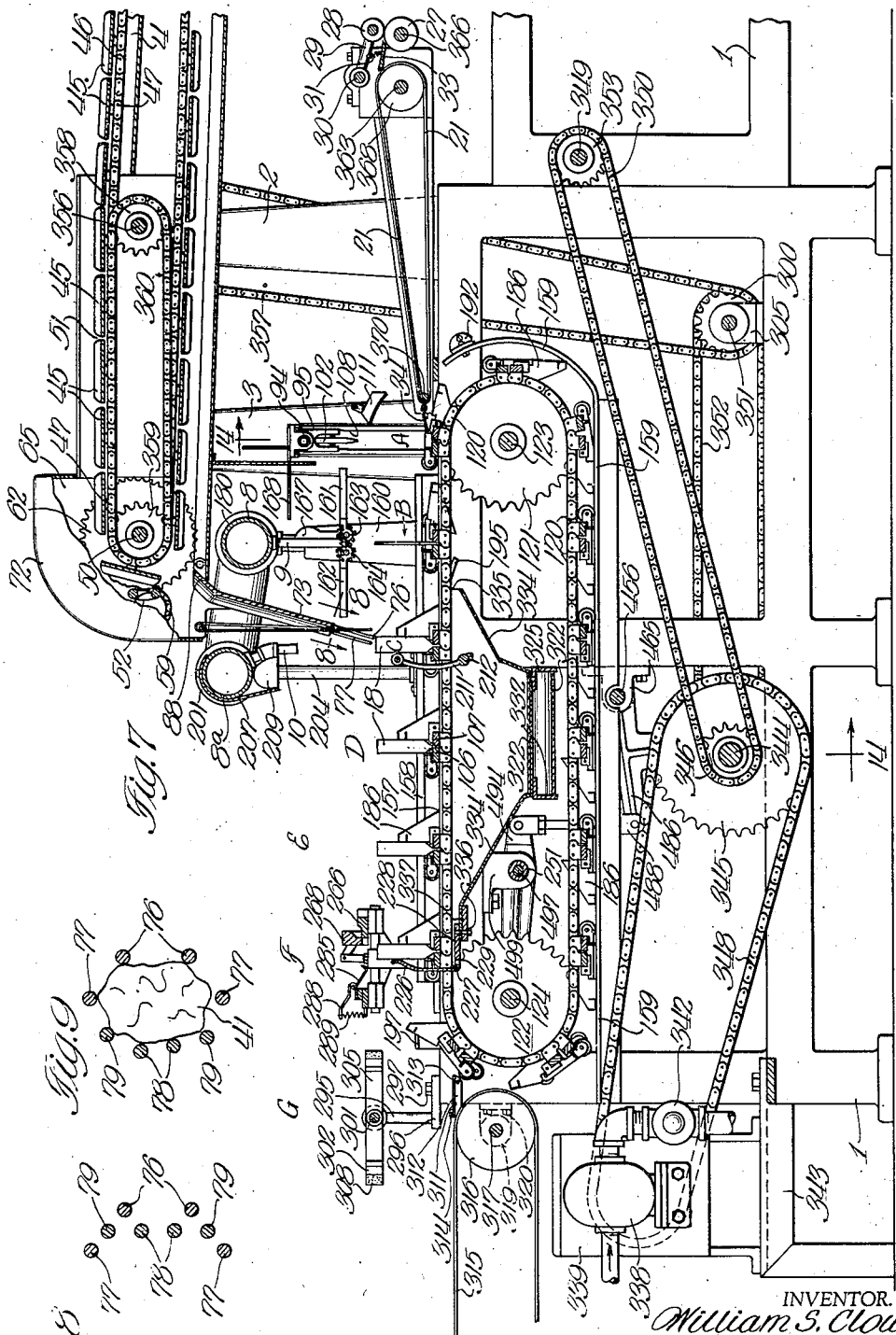
INVENTOR.
William S. Cloud
BY John R. Porter
ATTORNEY.

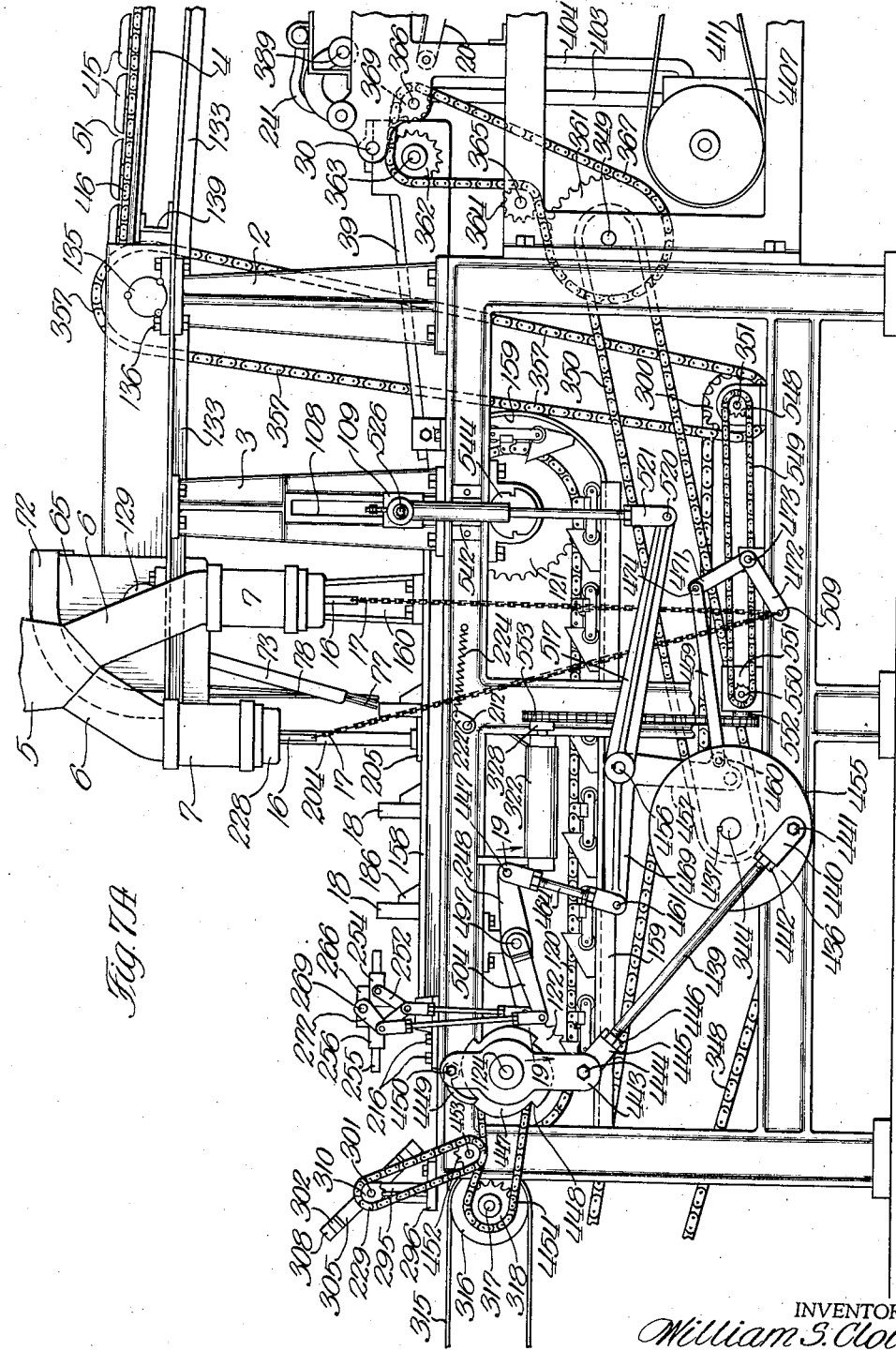

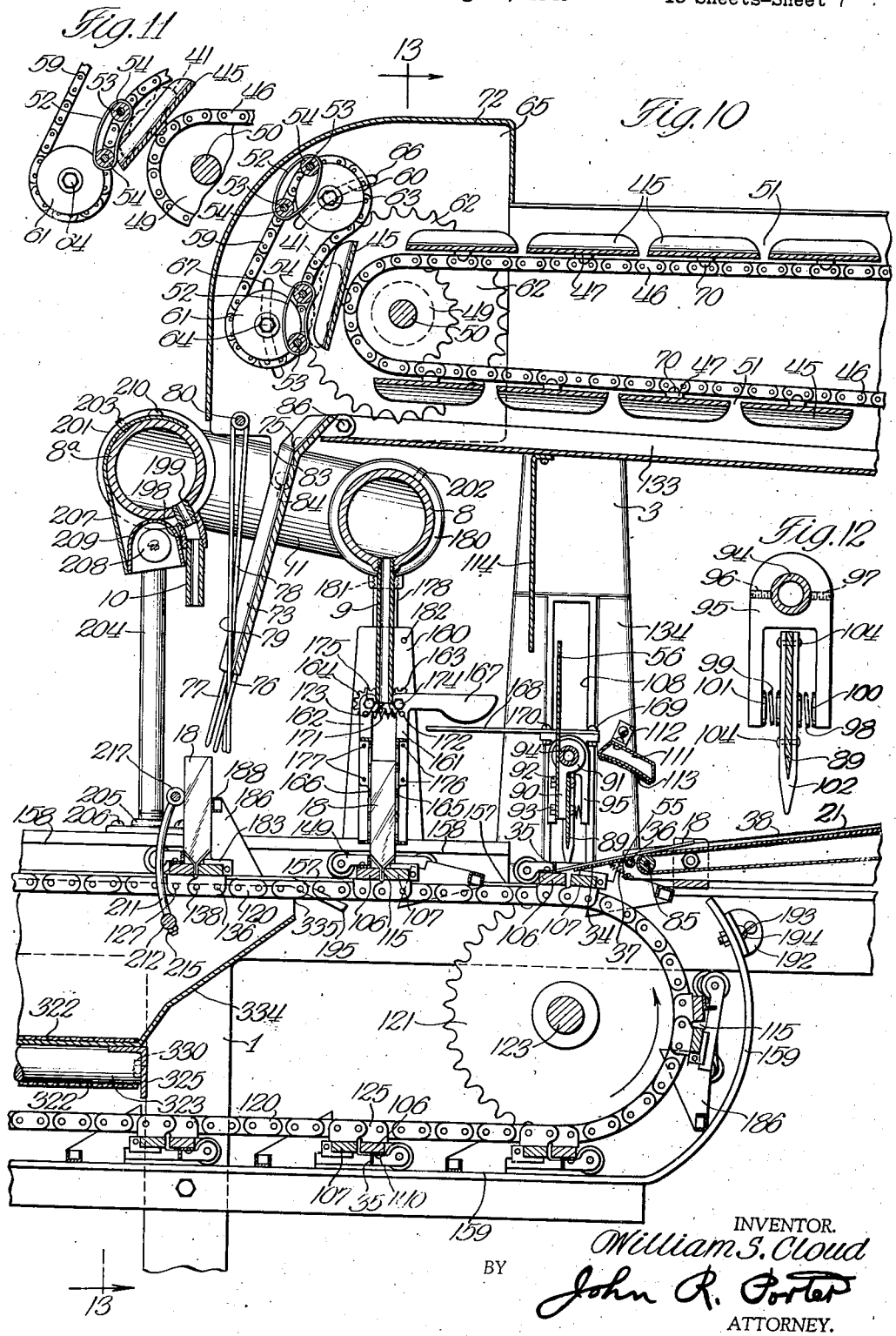

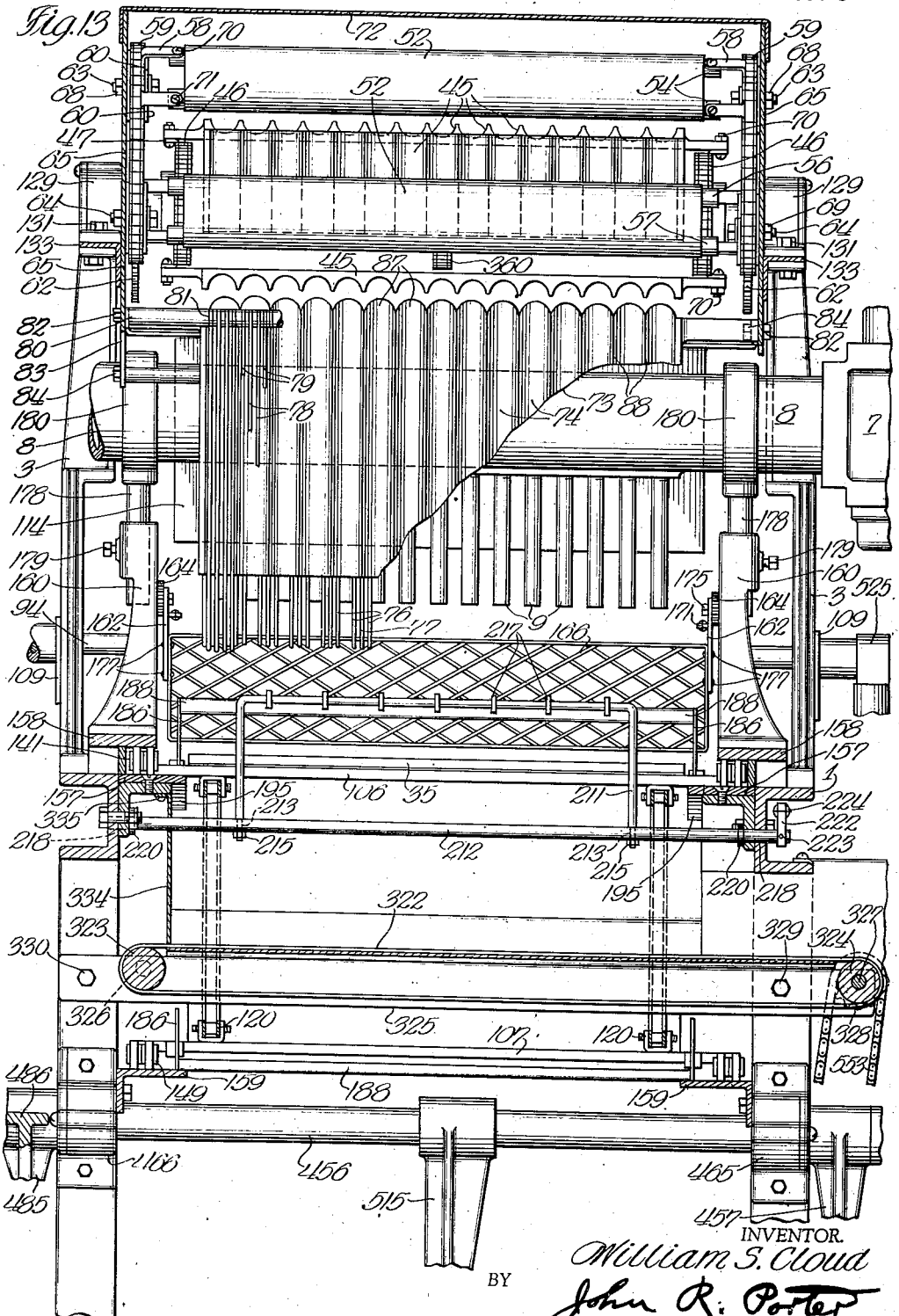

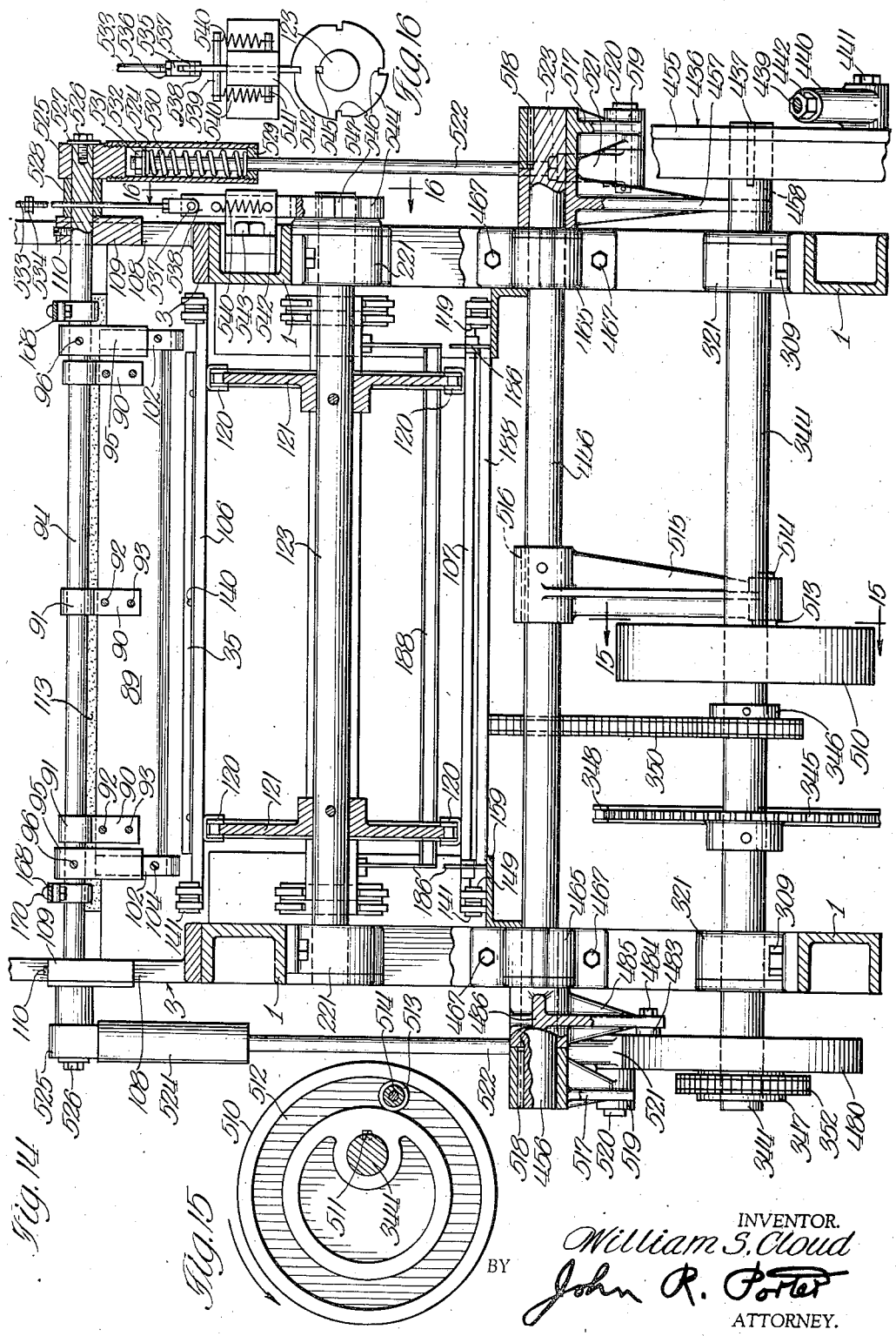

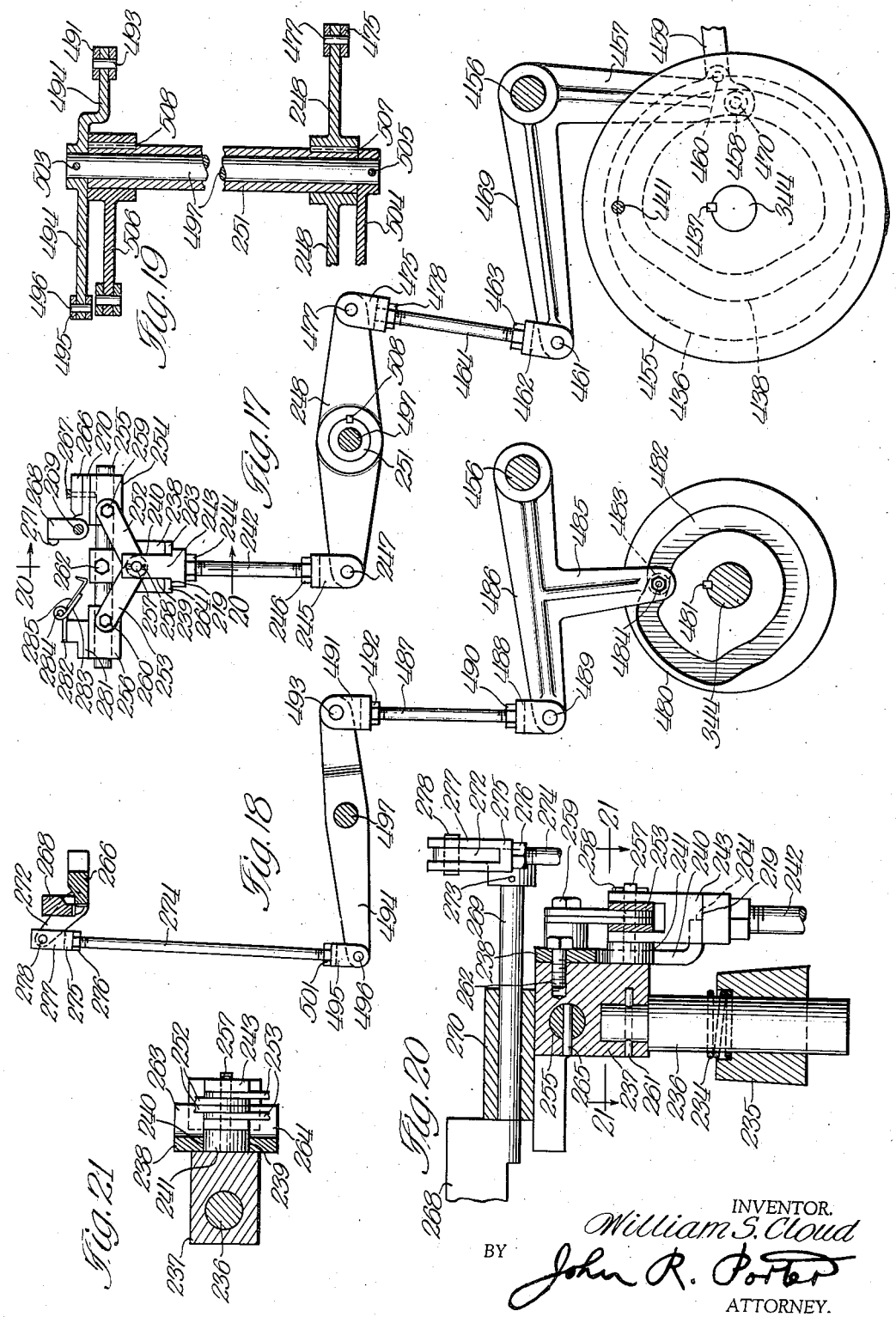

Sept. 8, 1942.   W. S. CLOUD   2,295,335
PROCESS AND APPARATUS FOR PACKAGING ARTICLES
Filed Aug. 3, 1940   13 Sheets-Sheet 11
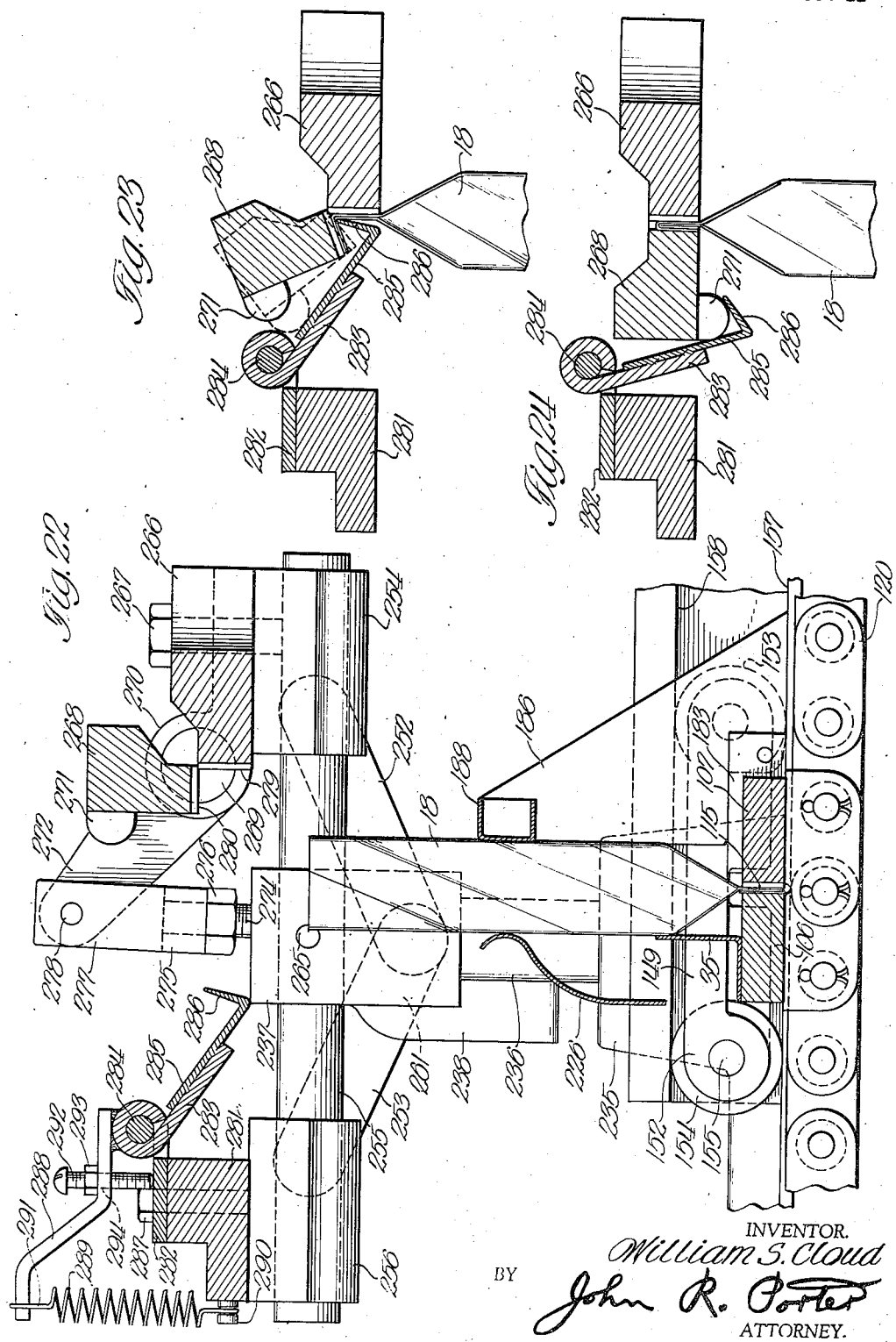
INVENTOR.
William S. Cloud
BY John R. Porter
ATTORNEY.

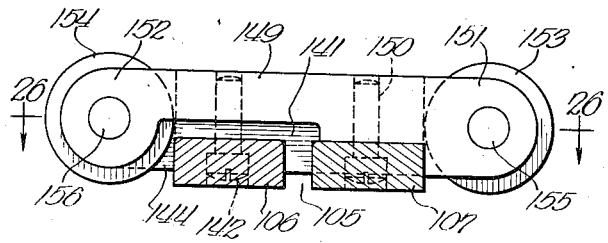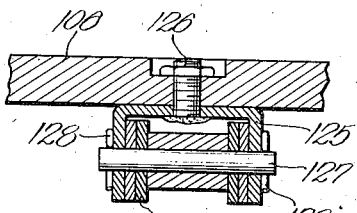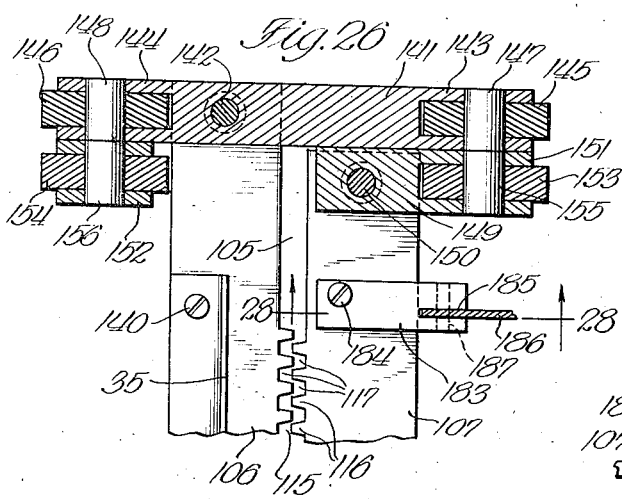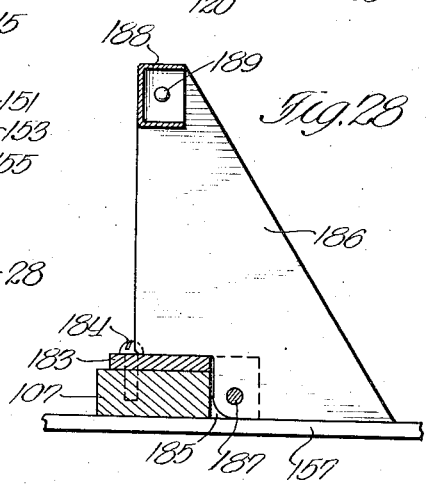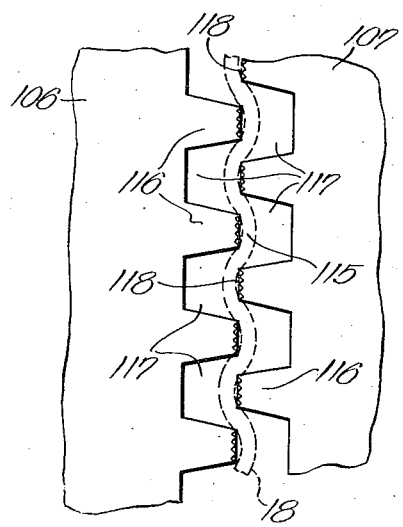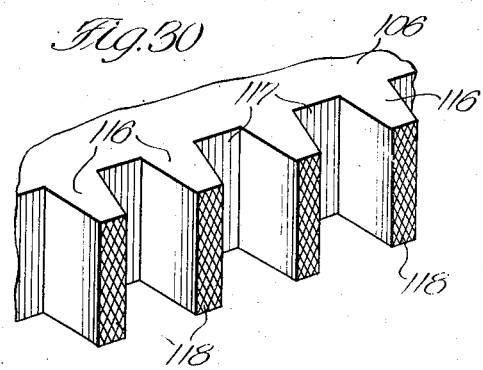

Sept. 8, 1942. W. S. CLOUD 2,295,335
PROCESS AND APPARATUS FOR PACKAGING ARTICLES
Filed Aug. 3, 1940 13 Sheets-Sheet 13
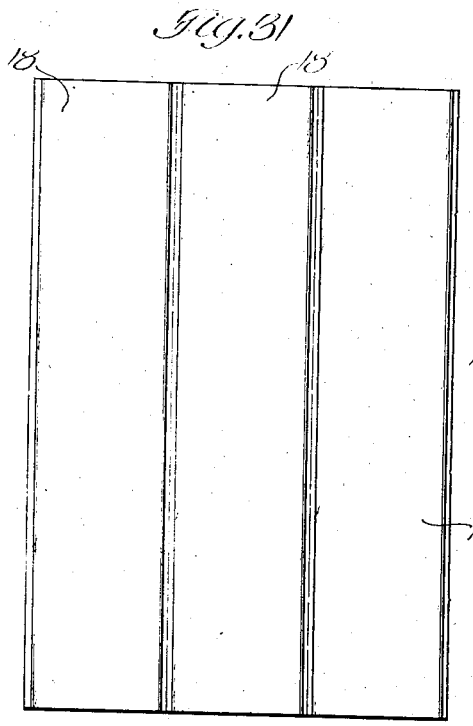
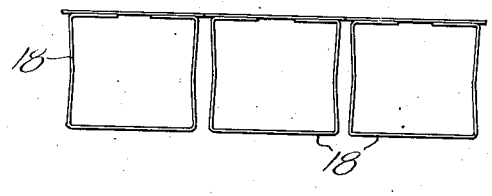
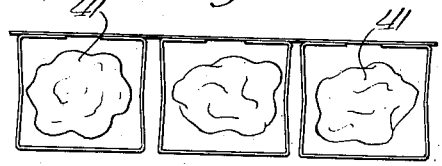
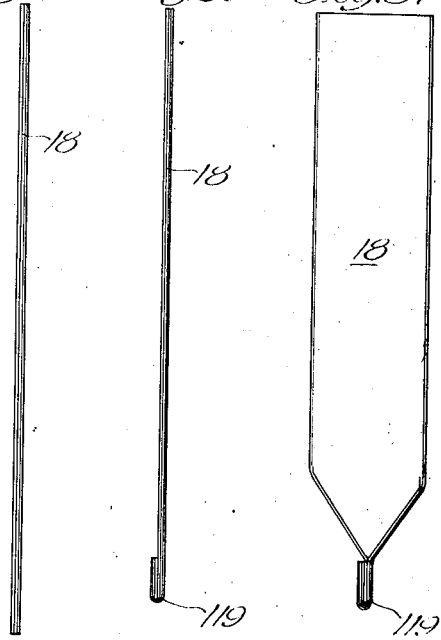
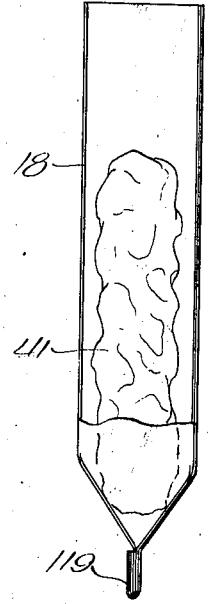
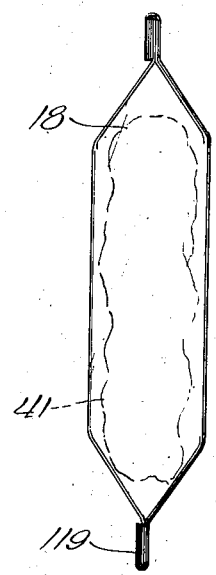
INVENTOR.
William S. Cloud
BY John R. Porter
ATTORNEY.

Patented Sept. 8, 1942

2,295,335

UNITED STATES PATENT OFFICE 2,295,335

PROCESS AND APPARATUS FOR PACKAGING ARTICLES

William S. Cloud, Wilmette, Ill.

Application August 3, 1940, Serial No. 350,986

15 Claims. (Cl. 93—3)

This invention relates to improvements in the process and apparatus for packaging articles of various sizes and shapes, such as candy bars, cookies, cigars, and similar objects, and includes arranging the articles for packaging into receptacles, arranging the receptacles for receiving the articles, inserting the articles into the receptacles and closing the same.

The process and machine will be described and illustrated with reference to the arrangement and packaging of candy bars, but it will be understood that its utility is not limited to this particular field.

In the production of candy bars and other small articles to be sold at retail for as little as one cent or five cents per unit, industry is constantly struggling with the problem of expense involved in placing such articles in individual packages. One of the difficulties often encountered is the irregular shape, size, and weight of the various articles within a given group or class of products. This is particularly apparent where such articles are covered with material such as nuts, or other irregular substances.

This invention has as one of its objects, the providing of fast and economical means for packaging such articles and, in actual practice, upwards of two hundred fifty thousand units have been packaged in a single eight hour working day by one of these machines. More particularly, one of the objects of the invention is to arrange the articles to be packaged in predetermined order and to deliver a definite number or quantity thereof, in order, to the mouths of receptacles adapted to receive and hold the same.

A further object is to provide means for automatically and continuously feeding paper tube-like receptacles, either singly or joined together in sheets of two or more, to a folding, crimping, and filling mechanism, the delivery of said receptacles being in timed relation thereto.

A further object of my invention is to fold and secure one end of each receptacle in a series or sheet of joined paper receptacles, to hold the same in substantially vertical position with the unfolded end up, to open the receptacles, and to deliver the opened receptacles to a position for receiving the articles to be packaged.

Various types and designs of paper tube-like receptacles can be used in practicing this invention, although it is deemed preferable to use a type similar to that referred to in United States Letters Patent Number 2,180,338 issued to applicant on November 21, 1939, and in United States Letters Patent Number 2,190,823 issued to applicant on February 20, 1940.

A further object of this invention is to provide automatic means of lateral support for a series of joined paper receptacles while articles of merchandise are placed therein, thereby avoiding the possibility of rupture of the receptacles and facilitating the filling operation.

A further object is to provide automatically adjustable means for guiding articles into the open ends of a series of joined paper receptacles.

A further object is to provide means for folding and securing the open or top ends of a series of joined paper receptacles after articles of merchandise have been placed therein, and to deliver the filled and closed receptacles to a delivery belt or conveyor.

It must be understood that my invention is adaptable for use in filling receptacles one at a time, in joined series of two or more receptacles, or in simultaneously filling a series of two or more packages which are not joined. It is obvious that the advantages of speed and economy are best realized by presenting, filling, and closing a plurality of receptacles simultaneously.

Other objects and advantages of the invention will appear hereinafter.

A preferred embodiment of the invention selected for purposes of illustration is shown in the accompanying drawings, in which, Figure 1 is a diagrammatic view of the packaging operation, including 7 stations indicated as A to G inclusive.

Figure 2 is a side elevation of the complete machine, shown from the left side.

Figure 2A is a side elevation of the aligning mechanism.

Figure 2B is a longitudinal section of the aligning mechanism.

Figure 3 is a detail view of air valve.

Figure 4 is a plan view of the machine.

Figure 5 is a side elevation of the complete machine, shown from the right side.

Figure 6 is a plan section taken on line 6—6 of Figure 2.

Figure 7 is a longitudinal section taken on line 7—7 of Figure 6.

Figure 7A is a side elevation of a portion of the machine illustrated in Figure 7.

Figure 8 is a section of chute guide rods taken on line 8—8 of Figure 7, illustrating guide rods in normal position.

Figure 9 is a view similar to Figure 8, showing guide rods in actuated position.

Figure 10 is an enlarged section of a portion of the machine shown in Figure 7.

Figure 11 is a fragmentary view of the candy releasing mechanism, shown in changed position from that illustrated in Figure 10.

Figure 12 is an enlarged detail section view of the blade holding mechanism.

Figure 13 is a cross section taken on approximately line 13—13 of Figure 10.

Figure 14 is a cross section taken on line 14—14 of Figure 7.

Figure 15 is a section taken on line 15—15 of Figure 14.

Figure 16 is a section taken on line 16—16 of Figure 14.

Figure 17 is an elevation of the mechanism employed to close the packages and to bring the top crimping racks into operating position.

Figure 18 is an elevation of the mechanism employed to operate the top crimping racks, as viewed from the center of the machine looking toward the right side.

Figure 19 is a section through the rocker arm shafts taken on line 19—19 of Figure 7A.

Figure 20 is a section taken on line 20—20 of Figure 17.

Figure 21 is a plan section taken on line 21—21 of Figure 20.

Figure 22 is an enlarged detail section of package holding and top crimping mechanism.

Figure 23 is a fragmentary view of the top crimping mechanism illustrated in Figure 22 and shown in changed position.

Figure 24 is a view similar to that of Figure 23, showing top crimping mechanism in final operating position.

Figure 25 is a detail of rack guide arms.

Figure 26 is a horizontal section taken on line 26—26 of Figure 25.

Figure 27 is a fragmentary section of crimping rack and chain.

Figure 28 is a section of package supporting bracket taken on line 28—28 of Figure 26.

Figure 29 is an enlarged detail of a portion of racks 106 and 107.

Figure 30 is a perspective illustrating serrated faces of rack teeth.

Figure 31 is a face view of a plurality of joined paper receptacles.

Figure 32 is a plan view of receptacles shown in Figure 31.

Figure 33 is a view similar to Figure 32, showing receptacles expanded.

Figure 34 is a view similar to Figure 33, showing pieces of candy inserted into receptacles.

Figure 35 is an edge view of a single tube or receptacle.

Figure 36 is a view similar to Figure 35, showing the bottom edge of receptacle folded and crimped.

Figure 37 is a side view of a single receptacle in expanded position.

Figure 38 is a view similar to Figure 37, broken away to show a piece of candy inserted therein.

Figure 39 is a completed package containing a piece of candy.

Reference is first made to Figure 1, where a general diagrammatic illustration is made of the entire packaging operation. It will be noted that certain stations have been designated by letters A to G inclusive to facilitate reference to these 7 steps of the operation.

In order that the detailed description of my invention may be more easily understood, I have provided a general outline thereof, as follows.

Candy bars 41 are delivered to the machine by conveyor belt 42 passing over pulley 43, from which belt they are dropped upon a grooved chute 44 where they are held momentarily in aligned relation by stop pins 565 projecting through apertures 568 in grooves 567 of said chute (Figure 2B). Stop pins 565 are actuated by arm 558 and cam 554 in timed relation to chains 46 carrying aluminum cups 45 so as to release one row of candy bars 41 for each row of cups 45.

The pieces of candy are conveyed by cups 45 on chains 46 to a point immediately above grooved chute 73, where chains 46 pass around sprockets 49 causing cups 45 to be inverted, the candy sliding therefrom and falling to chute 73.

A supply of paper tube-like receptacles 18, arranged in sheets or webs (Figure 31), is placed in vertical stacked position on conveyor belt 19 which moves toward the left from pulley 427 (Figure 1). As belt 19 passes over pulley 428, receptacles 18 drop to conveyor belt 20 which also travels toward the left and at a speed greater than that of belt 19, the difference in speed of the 2 belts, together with the fact that the last few sheets of receptacles carried on belt 20 lean against the top portion of the most advanced sheets on belt 19, causing the bottom edges of receptacles 18 to move forward faster than the top edges thereof. This results in each sheet of receptacles being forced partially underneath the immediately preceding sheet as belt 20 carries the same forward to stop 409 which prevents further forward movement and causes the sheets to be stacked, one on top of another, with each added sheet being fed into the stack at the bottom thereof.

From this stack each sheet is lifted by an automatic suction feeding device of standard construction, including suction fingers 408 and vacuum contact openings 26, and is released from such feeding device in such position as to be in contact with driven roller 27 turning in counterclockwise direction, which pushes sheets 18 across transfer plate 33 to conveyor belt 21 which carries the sheets of receptacles toward the left until a predetermined portion of receptacles 18 has passed beyond the path of downward travel of blade 89 at station A.

Blade 89 is lowered until it strikes a sheet of receptacles 18 and forces the same downward into a space between two crimping and holding racks carried by chains 120.

The downward force exerted by blade 89 on the forward edges of receptacles 18 causes the raising of the rear edges thereof, and the release of blade 89 leaves receptacles 18 in a substantially vertical position with the bottom edges thereof folded, crimped, and held by the crimping and holding racks. Chains 120 carry receptacles 18 from station A to station B where compressed air passes from manifold 8 through nozzles 9 downward to receptacles 18. Above each of the receptacles comprising one sheet, a separate nozzle 9 is located. The discharge of compressed air over the paper receptacles causes them to be opened, in which condition they are carried by chains 120 to station C where each receptacle is positioned below one of the grooves of chute 73, down which pieces of candy 41 slide, one piece being guided into each paper receptacle. The receptacles are maintained in open position during the filling operation at station C by compressed air passing from manifold 8a through nozzles 10 which are suspended above station C.

Chains 120 carry each sheet of receptacles 18 from station C to stations D and E, which are idler stations, to provide for inspection of the filled packages. Any suitable number of such idler stations may be provided.

From station E, chains 120 carry each sheet of receptacles 18 to station F where a folding and crimping mechanism is lowered over the upper ends of the series of joined receptacles and said ends are there folded and crimped, closing each package. The top folding and crimping mechanism is then released and chains 120 carry the filled packages toward station G. As chains 120 pass around sprockets 122, the crimping and holding racks open and the movement of chains 120, together with the force of gravity, causes the filled packages to fall forward upon spacer plate 311 at station G. At this point a paddle wheel blade supported by arms 304 and caused to rotate in opposite direction to sprockets 122 comes in contact with each sheet of filled receptacles 18 and forces the same across plate 311 to conveyor belt 315 which carries said filled receptacles to a suitable place for being packed in boxes.

From the above general description it is apparent that the proper alignment of the articles, both transversely and longitudinally, before they enter the opened receptacles, is essential to the successful practice of this invention.

The pieces of candy 41, in this instance, are delivered from an enrobing or coating machine by conveyor belt 42 passing over pulley 43. At this point, the articles customarily are not positioned on conveyor belt 42 in any definite alignment. Some may be positioned crosswise of the belt and others may be lengthwise. The supply of articles per square foot of said conveyor belt may also vary from minute to minute. Where the supply increases or decreases materially for any extended period of time, means are provided to regulate the speed of the packaging machine accordingly.

Reference is made to Figures 2A and 2B, where chute 44 is mounted on longitudinal support members 4 by means of angles 570 and extends at an angle of approximately 45° from the discharge end of conveyor belt 42 to a position immediately above the plane of movement of cups 45 on chains 46. Chute 44 embodies a series of concave grooves 567 adapted to receive said pieces of candy 41 in longitudinal alignment.

L-shaped arms 558 are pivotally mounted on pivot screws 563 which extend through angles 570. Cross member 571 consists of a flat metal strip mounted upon L-shaped arms 558. Midway between arms 558 flat pin 564 is rigidly mounted on cross member 571, extending at a right angle thereto, and adapted to ride on the peripheral surface of cam 554 mounted on shaft 32.

Cross member 572 is an angle strip rigidly mounted on the lowermost ends of L-shaped members 558 and in which stop pins 565 are rigidly mounted by nuts 566 in predetermined spaced relation and at a right angle thereto.

In the center or bottom of each groove 567 is located an aperture 568 adapted to permit pin 565 to extend therethrough.

Cam 554 is mounted on cross shaft 32 at a point adjacent pin 564 and is adapted to engage said pin and thereby actuate arms 558 so as to cause stop pins 565 to move in and out of apertures 568. Shaft 32 carries sprocket 555 driven by chain 556 from sprocket 560 mounted on shaft 561. Coil spring 196 extends from angle iron support member 557 to one of L-shaped arms 558 and is adapted to hold pin 564 in contact with the peripheral surface of cam 554.

The comparative size of sprocket 555 with sprocket 560 is such that one complete revolution of cam 554 occurs while cups 45 are advanced one cup length by chains 46. In this manner stop pins 565 are actuated in timed relation to the movement of cups 45 so as to release one row of articles 41 for delivery to each row of said cups. It will be understood that inclined grooved chute 44 is so situated with reference to cups 45 that the grooves of the chute are in longitudinal alignment with said cups 45.

Cups 45 are arranged in rows separated by spaces 51, each row thereof consisting of a series of grooves in a metal plate rigidly mounted on chains 46 by bolts 70 passing through plates 47 (Figures 10 and 13). The length of the grooves or cups 45 should be approximately that of the article to be packaged and the number in each row may be varied from one to any convenient number. For purposes of illustration I have shown 15 cups or grooves in each row.

Chains 46 pass around sprockets 48 mounted on shaft 561 at the feed end of the machine and pass around driven sprockets 49 mounted on shaft 50 in bearings 129 bolted to supports 133 by bolts 131 at a position approximately over grooved chute 73. As chains 46 move from sprockets 48 toward sprockets 49 they are supported for the entire distance by angle iron tracks 4, mounted on channel irons 139 extending in transverse relation thereto. Irons 139 are rigidly mounted on support members 133 which extend longitudinally from a position approximately beneath sprockets 48 to a position approximately beneath sprockets 49, said angle irons 133 being mounted on standards 2 and 3 mounted on frame 1.

Frame 1 is of customary cast construction and is adapted to be rigidly fixed to a wooden or concrete floor. Standards 3 are located forward from standards 2 and serve an additional purpose hereafter explained.

Cups 45 are carried around sprockets 49 in an arc of 180°, during which they go from a horizontal upright position to a vertical and finally to an inverted horizontal position. As the angle to which the cups are tilted increases, candy articles 41, by reason of both gravity and centrifugal force, are moved forward in said cups and also downward toward grooved chute 73.

In the absence of provision of means to retain said articles 41 in said cups 45 until a proper point of release is reached, the candy or other articles will be thrown from or will drop out of cups 45 at various angles and at various times, thereby interfering materially with orderly packaging operations. However, to overcome this difficulty I have provided an automatic releasing mechanism which is operated in timed relation to the other moving parts of the machine. The releasing mechanism consists of two chains 59 passing around upper idler discs 60 and lower idler discs 61 mounted in slots 66 and 67 in side plates 65 by studs 63 and 64, and held in adjusted position by lock nuts 68 and 69, the outer surface of chains 59 being in contact with and driven by sprockets 62 mounted on shaft 50, said contact with sprockets 62 being limited to a portion of the periphery thereof (Figure 10).

Chains 59 are provided with links comprised in part of angular side plates 58 (Figure 13) to which sleeve supporting rods 53 are mounted by bolts 71. Rods 53 are provided with a thick and soft cover made of rubber or other suitable material 54. Disposed around each pair of rods 53 is a fabric sleeve 52 adapted to contact articles 41 during the automatic releasing operation. The soft rubber cover 54 enables the contact of sleeve 52 with articles 41 to be yieldable in nature, thereby avoiding breakage or disfigurement of the articles to be packaged.

Sleeves 52 are spaced on chains 59 so as to be in timed relation to the movement of cups 45 on chains 46 around sprockets 49, one sleeve being interposed adjacent to and at the forward ends of each series of cups 45 so as to retain articles 41 in said cups for a predetermined period of time and until said cups reach a predetermined position for discharge of their contents.

Figure 11 illustrates the manner in which sleeve 52 retains articles 41 in cups 45 while Figure 10 indicates sleeve 52 in a more advanced operative position and at a point just prior to that of release. As rods 53 carry sleeve 52 around the lower idler discs 61, the more advanced portion of the sleeve is drawn away from articles 41. This separation is accentuated by the course of travel of cups 45 around the lower portion of sprockets 49, and effects an instantaneous release of the contents of a given row of cups 45, which release occurs when cups 45 are in alignment with the grooves of chute 73.

The release mechanism is partially covered by sheet metal housing 72, mounted on side plates 65.

Below and forward of sprockets 49, grooved chute 73 is rigidly mounted in semi-vertical position by stud bolts 84 to side plates 65 by means of extension 83, and by bolts 86 to plates 65 and support members 133, and is provided with an angular portion 75, and grooves 74 disposed between raised portions 88, said grooves corresponding in depth, width, curvature, and alignment to the grooves in cups 45. Chute 73 is provided with rods 76 and 77 rigidly mounted in and extending from the lower end thereof and being so placed as to constitute a rod-like continuation of said grooved chute, as illustrated in Figures 8, 9, 10 and 13.

Rods 78 and 79 are, by means of U bends at the upper ends thereof, pivotally and individually mounted in annular grooves 81 in the surface of cross rod 80 extending transversely between side plates 65, the ends of cross rod 80 being threaded to receive nuts 82 holding said rod in side plates 65 (Figure 13), rods 78 extending downward from the rear side of cross rod 80 and rods 79 extending downward from the front side thereof, said rods 78 and 79 being suspended in approximately vertical position in front of chute 73 and being adapted to yieldably contact and guide articles 41 as they descend along chute 73 to the paper receptacles below.

As illustrated in Figures 8 and 9, fixed rods 76 and 77 and movable rods 78 and 79 are so positioned as to form yieldable cage-like guide means adapted to automatic adjustment to the size and shape of the articles passing therethrough and to yieldably direct the course of travel thereof into the mouths of paper receptacles 18 adapted to receive the same.

The upper ends of grooves 74 in chute 73 are provided with curved extensions 87 (Figure 13) which are adapted to cooperate with the grooves of cups 45 so as to reduce the space between said cups and grooved chute 73 as said cups are carried beyond the top of said chute, thereby providing means for dislodging from cups 45 any articles which might remain therein.

Empty packages or receptacles 18 to be fed into the machine are placed in vertical stacked position (Figure 1) on conveyor belt 19 which passes over driving pulley 427 mounted on shaft 425 in bearings 431 attached to frame 1 and over idler pulley 428 mounted on shaft 429 in take-up bearings 435. Pulleys 427 and 428, as illustrated in Figure 1, rotate in counter-clockwise direction, thereby causing receptacles 18 to be moved toward filling station C of the machine.

Receptacles 18 are held in stacked position on belt 19 by backstop 40 and side wall guide plate 38 rigidly fixed to main frame 1 and disposed along the left side of belt 19 (Figure 2). When sheets or strips of empty receptacles 18 (Figure 31) are placed on belt 19 the ends or edges thereof on one side are preferably in contact with side wall 38. Backstop 40 supports the rear portion of the stack of empty receptacles in a manner similar to that of a bookend.

On shaft 426 located below and forward of pulley 428, driving pulley 430 is mounted in such position that a portion thereof is directly below pulley 428. Conveyor belt 20 passes around pulley 430 and also idler pulley 432 mounted on shaft 433 and is adapted to receive empty receptacles 18 as they are delivered from belt 19. Belt 20 travels in similar direction to belt 19, although at greater speed, the difference in speed together with the fact that the last few sheets of receptacles 18 on belt 20 lean back against the top portion of the most advanced sheets on belt 19 causing the bottom edges of said sheets to move forward momentarily faster than the top edges thereof, causing said sheets to be positioned on belt 20 with each sheet being partially underneath the immediately preceding sheet, in which relative position said sheets are carried forward to the discharge end of belt 20 where they are brought into contact with stop member 409 consisting of a rectangular shaped pipe mounted by cross bracket on frame 1, causing said sheets to be retained in stacked relation on the forward end of belt 20.

Stop member 409 is provided with a series of air vents (not shown) adjacent said stacked sheets through which compressed air passes into said stack of sheets in sufficient volume to partially separate the uppermost two or three sheets from the balance of the stack and thereby to assist in the removal thereof from said stack one at a time.

Conventional control mechanism is provided so that belts 19 and 20 are actuated only when the quantity of stacked sheets 18 adjacent stop member 409 reaches a predetermined minimum level, and are stopped when a predetermined maximum level is reached.

The top sheet of receptacles 18 is removed from the stack at the discharge end of belt 20 by an automatic suction feeding device of standard construction including segments 22 pivotally mounted on shaft 389 and containing air passages 25 for vacuum delivered from pipe 24 and with outlets 26 at sheet contacting surfaces, which suction device lifts said top sheet by said vacuum, and by means of partial rotation of shaft 389 feeds said sheet between positively driven roller 27 mounted on shaft 366 and idler roller 28 mounted on arm 29 which is pivotally mounted on shaft 30 and held against roller 27 under tension of spring 31.

Filler plate 33, rigidly mounted by brackets to frame 1, is disposed between the uppermost surfaces of roller 27 and roller 368 and is adapted to provide support for sheets 18 as they pass from rollers 27 and 28 to conveyor belt 21 which passes around driving pulley 368 mounted on shaft 363 and idler roller 370 mounted on shaft 85.

Mounted on frame 1 adjacent one side of belt 21 is side wall guide plate 39 (Figures 2 and 6) disposed at an angle to the path of travel of belt 21 and adapted to engage the edges of sheets of receptacles 18 as said sheets are carried forward on belt 21 and to align said sheets in predetermined manner for presentation to the holding and crimping mechanism hereinafter described.

Generally speaking, the holding and crimping mechanism, as illustrated, consists of 2 endless chains adapted to travel in parallel relation around 2 pairs of sprockets, a number of the links of said chains being provided with side plates upon which are mounted holding and crimping racks or cross members extending transversely between and beyond said chains and adapted to receive and hold empty receptacles in predetermined position for being filled, and, in cooperation with a vertically moving blade, to fold and crimp the lower ends of the same, and to carry the filled receptacles to a proper position for the folding and crimping of the upper ends thereof and to carry the filled and completely closed receptacles to a point of discharge from the machine.

As illustrated in Figure 7, chains 120 pass around sprockets 121 mounted on shaft 123 adapted to rotate in bearings 221 attached to frame 1 and sprockets 122 mounted on and driven by shaft 124 adapted to rotate in ball bearing pillow blocks 103 bolted to frame 1 (Figure 5), said sprockets as shown in Figure 7 (from left side) turning in counter-clockwise direction. In predetermined spaced relation, holding and crimping racks 106 and 107 are rigidly mounted on chains 120 by means of bolts 126 through U-shaped plates 125 (Figure 27) mounted on pins 127 and held in position thereon by cotter pins 128.

The holes in racks 107 through which bolts 126 pass are elongated so as to permit movement of racks 107 forward or backward with relation to rack 106, thereby decreasing or increasing space 115 therebetween, as proper adjustment may require.

Outwardly from points of mounting on chains 120, racks 106 and 107 are mounted on guide arms 141 and 149 respectively (Figure 26) by means of bolts 142 and 150. Guide arms 141 include forked extensions 143 and 144 in which rollers 145 and 146 are rotatably mounted on pins 147 and 148. Guide arms 149 include forked extensions 151 and 152 in which rollers 153 and 154 are rotatably mounted on pins 155 and 156.

As guide arms 141 and 149 are moved from station A to station F (Figure 1) they pass along lower tracks 157 consisting of strips of flat iron rigidly mounted on frame 1 and extending from a position approximately above shaft 123 to a position approximately above shaft 124 (Figure 7) and along upper tracks 158 consisting of strips of flat iron rigidly mounted to frame 1 and extending from a position immediately forward of blade 89 to a point approximately above shaft 124, said tracks 157 and 158 being in superimposed parallel relation.

Lower tracks 157, in cooperation with guide arms 141 and 149, support chains 120 as they pass from sprocket 121 to sprocket 122, and in cooperation with upper tracks 158 so determine the relative positions of guide arms 141 and 149 to each other as to adjust to a predetermined extent the amount of space 115 between racks 106 and 107 as they pass from underneath blade 89 forwardly to station F.

As chains 120 pass from sprockets 122 to sprockets 121, guide arms 141 and 149 are partially supported by flat iron tracks 159 rigidly mounted on frame 1. From a point below sprockets 121, tracks 159 are curved upward in conformity to the curve of sprockets 121 to a point adjacent the top of said sprockets (Figure 10) where said tracks are rigidly fixed to frame 1 by bolts 193 and 194 through brackets 192, said curved extension of tracks 159 being adapted to hold triangular plates 186 in predetermined retarded position until said plates reach the top of sprockets 121.

Holding and crimping racks 106 and 107 are of gear rack-like construction, being mounted on chains 120 in such manner as to enable teeth 116 of racks 106 to be disposed opposite spaces 117 between teeth 116 of racks 107, the faces 118 of teeth 116 being serrated.

Racks 106 and 107 are so mounted on chains 120 that when said racks are carried around sprockets 121 space 115 is sufficiently increased to enable a predetermined portion of receptacles 18 to be inserted between opposite faces of teeth 116 of said racks at station A. As chains 120 carry said racks from station A to station B guide arms 141 and 149 engage upper tracks 158 and lower tracks 157, causing space 115 to be sufficiently decreased to enable teeth 116 of said racks to cooperatively engage receptacles 18 in firm relation, thereby crimping and holding the same. Figure 36 illustrates the first crimp 119.

Adjacent each of the ends of racks 107, a triangular plate member 186 is pivotally mounted on pin 187 extending through slot 185 in bracket 183 rigidly mounted to rack 107 by screw 184. Extending between opposite triangular plates 186 mounted on racks 107 is a channel shaped member 188 rigidly mounted by rivets 189 to the uppermost portion of said plates 186 (Figures 13 and 28).

Rigidly mounted by screws 140 on racks 106 and extending substantially the entire length thereof are angle iron stop members 35 adapted to contact the forward edge of each series of receptacles 18 and to limit the forward movement thereof as said receptacles are fed from belt 21 across teeth 116 and space 115 at station A (Figure 10).

Immediately forward from the discharge end of belt 21 and in approximately the same plane, transfer plate 34 is pivotally mounted on pintles 36 and yieldably held against stops 55 (Figures 6 and 10) by spring 37 so as to permit racks 106 and 107 and stops 35 to pass thereunder while in contact therewith. As sheets of receptacles 18 are discharged from belt 21 they slide across plate 34 to stop 35 mounted on rack 106. In this position, a predetermined portion of receptacles 18 is placed beyond the downward path of travel of blade 89 at station A.

Blade 89, consisting of flat sheet metal having its lower edge sharpened, is slideably mounted for vertical movement along track surfaces 108 of forked extensions 134 of standards 3 by means of cross shaft 94 rigidly mounted by set screws 110 to guide block members 109. Blade 89 is pivotally mounted on cross shaft 94 by bolts 92 and 93 through extensions 90 of collars 91 and extends transversely of the machine a distance sufficient to correspond to the length of space 115 between the rows of teeth 116 of racks 106 and 107.

Inwardly from guide blocks 109 inverted U members 95 are rigidly mounted by set screws 96 and 97 (Figure 12) to cross shaft 94, the forked extensions of which U members are adapted to extend downward over but not in contact with blade 89. Springs 98 and 99 are mounted by bosses 100 and 101 within U members 95 in horizontal opposed relation on either side of and in yieldable contact with shield-like reinforcement members 102 rigidly secured to the ends of blade 89 by rivets 104 (Figure 12), and are adapted to permit blade 89 a limited pivotal movement on shaft 94 by means of collars 91, thereby making possible the vertical alignment of blade 89 with space 115 between teeth 116 of racks 106 and 107 as shield members 102 descend into grooves 105 between the opposite ends of racks 106, 107 (Figure 6).

Rigidly mounted on shaft 94 by bolts and lock nuts 169, 170, and between U members 95 and slide blocks 109 are arms 168 extending forward horizontally and adapted to contact arm extensions 167 of screen flap mechanism described hereinafter.

Blade 89 is moved vertically in tracks 108 by connecting rods 522 extending through sleeves 524 which are threaded to bearings 525 carrying shaft 94. Disposed around the upper portion of connecting rods 522 are coil springs 530 between washers 532 and nut 531 on the end of rods 522 and plug 529 of sleeve 524, said springs adapted to provide cushion means for rods 522 on the down stroke thereof should blade 89 meet an obstruction before the normal down stroke is completed (Figure 14).

Bearings 525 are held in proper position on shaft 94 by bolts 526, washers 527, and collars 528. Connecting rods 522 are actuated by means hereinafter described.

As illustrated in Figure 10, curved stop member 111, consisting of sheet metal or other suitable material, with roughened surface 113, is rigidly mounted by clip angles 112 to rearmost fork extensions 134 of standards 3 at a point above and to the rear of the point of contact between blade 89 and receptacles 18 at station A, stop member 111 being adapted to prevent receptacles 18 from being withdrawn from space 115 between racks 106 and 107 as blade 89 is raised therefrom (Figure 10).

Located forward from standards 3 and extending transversely for the entire width of the machine, air manifold 8 is rigidly mounted on standards 160 by means of rings 180, set screws 202 through said rings, threaded collars 181 extending downward from said rings, pipe support members 178 screwed into threaded collars 181 and slideably mounted in standards 160 and fixed in adjusted position by set screws 179 (Figure 13). Standards 160 are screwed to frame 1 by bolts 190, 191 (Figure 6).

Extending downwardly in substantially vertical position from manifold 8 are nozzles 9 which are screwed into threaded openings in the underside of said manifold 8 in predetermined spaced relation, said nozzles being adapted to direct compressed air from manifold 8 downwardly to the unopened ends of receptacles 18 held thereunder in substantially vertical position in racks 106, 107, and yieldably supported by screen flaps 165, 166 (Figure 10).

Screen flap members 165, 166 are pivotally mounted to the inside of standards 160 by arms 161, 162, welded to gears 163, 164, rotatably mounted on stud bolts 174, 175 which are anchored horizontally to standards 160, said gears being mounted in engaged relation. Flap members 165, 166 are constructed of suitable wire mesh, as illustrated in Figure 13, and are rigidly mounted on arms 161, 162, by means of rivets 176, 177. Rear arms 161 include extensions 167 disposed at right angle to said arms, said extensions being adapted for engagement with arms 168 attached to cross shaft 94 as blade 89 is raised.

Coil springs 171 are attached to arms 161, 162, by pins 172, 173, located immediately adjacent studs 174, 175, on which gears 163, 164, rotate. When extensions 167 of arms 161 are in horizontal position, the tension of springs 171 holds arms 161 and 162 in yieldable vertical position thereby bringing screen flaps 165, 166, into position for yieldably supporting empty receptacles 18 immediately before and during the opening of said receptacles by compressed air discharged from nozzles 9.

As arms 168 move upward with blade 89, they engage arm extensions 167 causing the same to move from horizontal to substantially vertical position during which operation the upward movement of extensions 167 is aided by the tension of springs 171 after pins 172, 173, are elevated above the center of gears 163, 164. The upward movement of extensions 167 is limited by means of stop pins 182 extending horizontally from standards 160. The movement of extensions 167 to a substantially vertical position causes arms 161, 162 to be raised to a substantially horizontal position at which time a new sheet of empty receptacles 18 is brought into predetermined position beneath nozzles 9 by means of racks 106, 107, mounted on chains 120.

As blade 89 is moved downward arms 168 contact arms 161 and cause the same to be returned from a substantially horizontal to a substantially vertical position, said movement of arms 161, 162, being aided by the tension of springs 171 after pins 172, 173, are lowered below the center of gears 163, 164 (Figure 10). This operation occurs at station B (Figure 1).

Baffle plate 56 is vertically mounted on collar extension plates 90 and baffle plate 114 is vertically suspended from angle iron supports 133 at a position above and forward from the plane of movement of blade 89, said baffle plates being adapted to cooperatively deflect air discharged out of nozzles 9 from empty packages on belt 21 (Figure 10).

Extending downwardly at an angle from the inside edges of tracks 157 and immediately forward from station B, are track extensions 195 adapted to engage triangular plates 186 as racks 106, 107 are moved by chains 120 from station B to station C, thereby causing said triangular plates to be elevated from horizontal to vertical position with cross member 188 in elevated position and in predetermined positive supporting engagement with receptacles 18 at station C (Figure 10). From this point forward to the end of tracks 157, plates 186 are maintained in elevated position by continued engagement with said tracks.

As each rack 106 is brought to rest at station C below chute 73 it contacts flap 211 comprising an inverted U-shaped rod member fixedly mounted inwardly from chains 120, in vertical openings 213 of cross shaft 212 and adapted to pivot with said shaft which is carried in bearings 218 mounted on frame 1. The lower ends of flap 211, extending through holes 213 in shaft 212, are threaded to receive nuts 215. Adjacent bearing 218, collars 220 are provided to prevent side play in shaft 212 (Figure 13).

As illustrated in Figure 10, the side arms of flap member 211 are curved so as to fit around the forward edge of each rack 106 in such manner as to cause metal rings 217 mounted on horizontal portion of said flap member to contact a sheet of receptacles 18 in predetermined manner intermediate the joined receptacles, thereby lending support to receptacles 18 as candy articles 41 descend grooved chute 73 into said receptacles without interfering with the means provided for maintaining said receptacles in open position.

Arm 222 is rigidly mounted on one end of shaft 212 by means of pin 223 (Figure 13). Coil spring 224 is looped through a hole in one end of arm 222 and is anchored on post 225 mounted on frame 1 (Figure 2), and is adapted to actuate arm 222 and shaft 212 so as to maintain flap 211 in yieldable contact with the forward edge of each rack 106. As each of said racks 106 is moved forward on chains 120 flap 211 is forced from a substantially vertical position to a substantially horizontal position thereby permitting racks 106, 107, to pass over said flap, after which the tension of spring 224 actuates arm 222 and shaft 212 causing flap 211 to return to its vertical position.

Air manifold 8a extending transversely for the entire width of the machine is rigidly mounted on standards 204 by means of rings 201, set screws 203 through said rings, and by threaded collars (not shown) similar in structure to collars 181 supporting manifold 8 heretofore described. Standards 204 are screwed into floor flanges 205 rigidly mounted on frame 1 by bolts 206 (Figure 10).

Threaded nipples 199 are mounted at an angle in threaded openings in the underside of manifold 8a, and are adapted to engage threaded elbows 198, in the lower ends of which are screwed nozzles 10 in substantially vertical position and in predetermined spaced relation, said nozzles being adapted to direct compressed air downwardly from manifold 8a to the top of open receptacles 18 held in substantially vertical position by racks 106, 107, cross member 188, and flap 217.

The discharge of compressed air from nozzles 10 is adapted to maintain receptacles 18 in open position in timed relation to the passage of candy articles 41 down chute 73 into said receptacles. This operation takes place at station C (Figure 10).

Air manifolds 8, 8a, are connected by U member 11, as illustrated in Figures 4, 5, and 10. Electric light 208 and reflector 209 are mounted in horizontal position underneath manifold 8a by being clamped to standards 204 in customary manner. Shield 207 is mounted on manifold 8a by set screws 210 and is adapted to provide a proper cover therefor (Figure 10).

From station C, racks 106, 107, and filled receptacles 18, are carried forward by chains 120 to idler stations D and E (Figure 1) where no additional mechanical operation takes place, although opportunity is thus provided for inspection and examination of the filled receptacles.

From idler station E the receptacles 18 are moved by racks 106, 107, and chains 120 forward to station F where means are provided for closing and crimping the upper, or open ends of the filled receptacles. The upper crimping mechanism at station F comprises crimping rack 266 rigidly mounted on block 254 by stud bolts 267, and crimping rack 268 pivotally mounted on shaft extensions 269 mounted in bearings 270 bolted to block 254 by studs 267 (Figure 22).

Racks 266 and 268 are of gear rack-like construction similar to racks 106, 107 (Figure 29), having roughened teeth surfaces 279, 280 (Figure 22) similar to surfaces 118 of racks 106, 107 (Figure 30). Cams 271 are welded to the underside at each end of pivotal crimping rack 268 and are adapted to actuate crimping blade 285 welded to leaf 283 hingeably mounted on pintle 284. Fixed leaf 282 of said hinge mechanism is rigidly mounted on filler 281 and block 256 by stud bolts 287. Z-shaped arm 288 is welded to movable leaf member 283 and is adapted, by means of the tension of coil spring 289 hooked in one end of said arm 288 by loop 291 and attached by a loop to pin 290 mounted on filler 281, to actuate said movable leaf 283 and said blade 285 from a substantially depending vertical position as illustrated in Figure 24 upward through an arc of substantially 30° to a position as illustrated in Figure 22. The upward movement of leaf 283 and blade 285 is limited by bolt 292 screwed through arm 288 by threads 294, adapted to contact fixed leaf 282 and being held in adjusted position by lock nut 293.

Tapered extension 286 extends upward at an angle of approximately 80° from blade 285 and is adapted for insertion into the angle of approximately 90° formed by the crimping surfaces of racks 266, 268 (illustrated in Figure 22). As blade 285 is moved toward said angle of said racks, extension 286 strikes one surface of the upper or open end of receptacles 18 and, in cooperation with surfaces 279 of rack 266 moving in opposed relation to said blade 285, closes the ends of said receptacles, subsequent to which it cooperates with rack 266 and pivotal rack 268 in folding (Figure 23) and crimping (Figure 24) said uppermost ends of receptacles 18. As rack 268 is pivoted in counter-clockwise direction (Figure 23) cams 271 strike blade 285 forcing said blade downward and out from the angle between opposing teeth surfaces of racks 266 and 268, in timed relation to the closing of said angle between said rack surfaces.

Shaft 269 is actuated by means of arms 272 rigidly mounted thereon by pins 273 (Figure 6), arms 272 being pivotally mounted by pins 278 in clevises 277 mounted on connecting rods 274 by sleeve 275 and lock nut 276 (Figure 22). Connecting rods 274 are actuated by means hereinafter described.

Blocks 254, carrying racks 266, 268 and blocks 256, carrying blade 285, are slideably mounted on horizontal rods 255 rigidly mounted equidistant from the ends thereof in blocks 237 by pins 265 (Figure 20). Blocks 237 are rigidly mounted by pins 261 on vertical rods 236, adapted to move vertically in bearings 235 mounted by bolts 216 to frame 1 (Figure 7A). Coil springs 234 disposed around rods 236 are seated in bearings 235 and are adapted to act as buffers when blocks 237 mounted on rods 236 are lowered to point of contact with bearings 235.

Blocks 254 and 256 are slideably mounted at opposite ends of horizontal rods 255 and are moved along said rods toward blocks 237 by means of links 252, 253, pivotally mounted by shoulder bolts 259, 260, to said sliding blocks, said links also being pivotally mounted by pins 257 and cotter pins 258 to roller members 241 pivotally mounted in clevises 243 threaded to receive connecting rods 242.

Roller members 241 are adapted to vertical movement along inner guide surfaces 239, 240, of inverted U members 238 bolted to the side of blocks 237 by bolts 262. Guide surfaces 239, 240, are beveled to conform to the roller surface of members 241. Clevises 243 are held in place on rods 242 by lock nuts 244 (Figures 17 and 20).

Clevises 243 are provided with shoulders 219 adapted to engage curved stops 263, 264, at the lower ends of grooves 239, 240, of inverted U members 238 at a predetermined point in the upstroke of connecting rods 242 (Figures 17 and 20).

It should be understood that the blocks 254 and 256 are not moved on rods 255 toward blocks 237 until said blocks 237 are lowered into contact with buffer springs 234 and bearing blocks 235. Likewise blocks 237 do not begin their upward movement until rods 242 have moved clevises 243 upward to a point where shoulders 219 contact curved stops 263, 264, of U members 238 (Figures 17 and 20).

Filled receptacles 18 are supported on their forward side at station F by flap device 226 pivotally mounted on pintles 227, which flap is of construction similar to flap 211 at station C, and is adapted to prevent packages 18 from moving forward when racks 106, 107, are stopped at station F and also to support said receptacles 18 in vertical position as the upper ends thereof are closed and crimped (Figure 7).

Forwardly from the ends of tracks 157 and approximately midway between stations F and G, bracket stop members 197 are mounted on frame 1 and are adapted to trip side plates 186 carrying cross rods 188 causing the same to fall back from an elevated position to a substantially horizontal position.

As racks 106, 107 are carried by chains 120 around the top of sprockets 122, space 115 between said racks is increased, thereby releasing the grip of teeth 116 from the lower ends of receptacles 18, which release, together with the momentum of travel about a portion of sprockets 122, causes the filled receptacles 18 to be ejected from said racks 106, 107, to flat cross plate 311 rigidly mounted to frame 1 by side angular brackets 312 and bolts 313, 314, between sprockets 122 and conveyor belt pulley 316, said cross plate being adapted to provide a surface across which receptacles 18 may slide from racks 106, 107, to conveyor belt 315 at station G (Figure 7).

A paddle wheel mechanism is located at the forward end of frame 1, approximately above shaft 317 carrying conveyor belt driving pulley 316 (Figures 6 and 7), said paddle wheel mechanism comprising standards 295 mounted on frame 1 by flanges 296 and bolts 297, shaft 301 mounted in bearings 299 on standards 295, arms 304, mounted on shaft 301 by set screws 306, cross bars 302 rigidly mounted on the ends of arms 304, and rubber cushion strips 308 affixed by adhesive or other suitable means to the outer edge of each of said cross bars 302. Sprocket 310 is mounted on one end of shaft 301 and is connected by chain 229 to one of double sprockets 452 rotatably mounted on stud 453 extending from frame 1 and driven by chain 454, sprockets 452 turning in clockwise direction (Figure 7A).

Rubber cushions 308 are of sufficient resiliency to avoid breaking filled receptacles 18 when in contact therewith at station G. As said receptacles 18 are released from racks 106, 107, and slide across transfer plate 311 to conveyor belt 315, cross bars 302 carrying cushions 308 are caused to rotate about shaft 301 in such manner as to contact said receptacles and by friction exerted thereon cause the same to be moved on to conveyor belt 315. Conveyor belt 315 is of standard construction and is driven by pulley 316 mounted on shaft 317 in bearings 319 attached to frame 1 by bolts 320, and is adapted to convey filled and closed receptacles 18 away from the machine.

Cross conveyor belt 322 located beneath stations C and D, passes around driven pulley 324 mounted on shaft 327 and idler pulley 323 mounted on shaft 326 and is adapted to receive and convey to one side of the machine any imperfect or broken articles 41 which might fall from filling station C. Shafts 326, 327, are mounted in cross angle members 325, 332, rigidly mounted on frame 1 by bolts 329, 330 (Figures 7 and 13). Sheet metal hopper 334 is conveniently located upward and at an angle from the sides of belt 322 and is attached to frame 1 by bolts 335, 336, and filled member 331 (Figure 7). Sprocket 328 is mounted on one end of shaft 327 and is driven by chain 553 from sprocket 552 mounted on shaft extension from right angle gear reducer 551 (Figures 7A and 13).

The main source of power for the machine is hydraulic gear motor 338 conveniently mounted at the forward end of frame 1. Throttle valve 342 is provided adjacent motor 338 and enables the operator to control the speed of the entire machine. Convenient means (not shown) may be provided whereby valve 342 may be operated from any desired place on the machine by remote control. Gear reducing mechanism of conventional type is provided in box 339 mounted on frame 1 by angle iron 343 which also supports gear motor 338. Main driving sprocket 340 is mounted on shaft 341 extending from the gear reducing mechanism in box 339.

Main counter shaft 344 is mounted in bearing pillow blocks 321 attached to frame 1 by bolts 309 beneath station D and is driven by sprocket 345 located between bearing 321 and sprocket 346, all being mounted thereon (Figure 14), and which is connected to main driving sprocket 340 by chain 348 (Figure 5).

Chains 129 which carry racks 106, 107, are actuated by means comprising cam plate 436 mounted by key 437 on main counter shaft 344, shoulder bolt 441, horizontally mounted on the outside of cam plate 436 and adapted to carry sleeve bearing 440 threaded to receive connecting rod 439 held in adjusted position by lock nut 442, the opposite end of rod 439 being threaded to engage sleeve 445 and lock nut 446, sleeve 445 being pivotally mounted on bolt 444 mounted horizontally through depending clevis-like side plates of rocker arm 443 pivotally mounted on shaft 124 (Figure 7A). The upper portion of rocker arm 443 is similar in structure to said lower portion thereof and comprises clevis-like side plates through which bolt 450 is horizontally mounted and adapted to carry pivotally pawl 449 adapted to engage teeth 448 of ratchet wheel 447 mounted on shaft 124 between said upper clevis-like side plates of rocker arm 443 (Figures 2 and 6).

By means of said connecting rod 439 pivotally mounted on cam plate 436, and rocker arm 443, and ratchet wheel 447, shaft 124 rotates through a predetermined portion of one revolution during every complete revolution of main counter shaft 344.

Sprockets 122 are mounted on shaft 124 inwardly from frame 1 and are connected to driven sprockets 121 mounted on shaft 123 by chains 120 which carry racks 106, 107 (Figure 7).

The intermittent rotation of shaft 124 by rocker arm 443 and ratchet wheel 447 as heretofore described causes chains 120 to carry racks 106, 107, through a predetermined distance between each stop thereof, which movements are in timed relation to the respective distances between stations A, B, C, D, E and F, to the speed of chains 46 carrying cups 45, to the discharge of compressed air from manifolds 8 and 8a, to the speed of segments 22 of the receptacle feeding mechanism, to the speed of blade 89 to the speed of flaps 165, 166, 211, and 226 to the speed of chains 59 carrying sleeves 52 of the release mechanism, to the reciprocating speed of pins 565 of the preliminary alignment mechanism, to the speed of top folding and crimping racks 266, 268, and blade 285, and to the speed of shaft 301 carrying support means for cushions 308 (Fig. 7).

Notched disc 544 is mounted by key 545 on one end of shaft 123 (Figure 16) and comprises a number of rectangular shaped notches 546 arranged in predetermined spaced relation about the periphery thereof and adapted to receive therein the lowermost end of blade 538 vertically suspended on pin 537 through clevis 535 downwardly through apertures in rectangular shaped guide member 542 rigidly mounted to frame 1 by bolts 543. Coil springs 540 are vertically mounted outside guide member 542 by pins 541 anchored horizontally in said guide member 542 and pin 539 horizontally mounted through an aperture in blade 538, and are adapted to hold blade 538 in engagement with the peripheral surface of disc 544, predetermined portions of which comprise flattened surfaces 547 adapted to carry blade 538 to notches 546. Clevis 535 is threaded to receive the lower end of stem 533 held in adjusted position by lock nut 536, said stem 533 extending vertically through an aperture in shaft 94 and spacer sleeve 528, nuts 534 being mounted on the top end of said stem 533.

As blade 89 and shaft 94 are raised, spacer sleeve 528 engages lower nut 534 on stem 533 and lifts blade 538 against the tension of springs 540 out of one of the notches 546 immediately prior to movement of chains 120, and prior to the rotation of disc 544 on shaft 123. As blade 89 and shaft 94 are lowered, blade 538 is drawn downward by springs 540 against the peripheral surface of disc 544 to a predetermined position with respect to the next notch 546 to be engaged (Figures 14 and 16). The action of disc 544 and blade 538 prevents the momentum of racks 106, 107, and chains 120 from carrying said members beyond or back from their predetermined position at any of the respective stations above described.

The alignment mechanism at the receiving end of the machine, together with chains 46 carrying cups 45, and the release mechanism above grooved chute 73 are driven by means comprising sprocket 347 mounted on one end of shaft 344 (Figure 5), sprocket 354 releasably mounted on secondary counter shaft 351 mounted in bearings 305 on frame 1 (Figure 7), chain 352 connecting sprockets 347 and 354, sprocket wheel 300 mounted inwardly from sprocket 354 on shaft 351 (Figure 7), sprocket 355 mounted on shaft 356 mounted in bearings 135 attached to standards 2 by bolts 136 and connected with sprocket 300 by chain 357 (Figures 5 and 7A), sprocket 358 mounted inwardly from sprocket 355 on shaft 356 (Figure 7), sprocket 359 mounted in the approximate center of shaft 50 which is forward from shaft 356, chain 360 adapted to drive sprocket 359 from sprocket 358 (Figure 7) thereby actuating shaft 50, sprockets 49 mounted inwardly from sprockets 62 on shaft 50 (Figures 10 and 13), sprockets 48 mounted on shaft 561 mounted in bearings 562 (Figures 1 and 2B), chains 46 connecting sprockets 48 and 49 and adapted to carry cups 45 (Figures 4 and 10), sprocket 560 mounted on shaft 561 between one of sprockets 48 and box-like frame member 569 (Figure 2A), sprocket 555 mounted on shaft 32 mounted in bearings 559 mounted on box 569, chain 556 connecting sprockets 555 and 560 (Figure 2A), sprockets 62 mounted between bearings 129 and sprockets 49 on shaft 50 and adapted to carry chains 59 as heretofore described (Figure 13).

A conventional clutch mechanism comprising plunger 137 urged by spring 138 into a notch in the hub of sprocket 354 (Figure 6) is provided to engage said sprocket with shaft 351. By means of a treadle (not shown) the operator may release said clutch device for one revolution of sprocket 354 during which revolution one cycle of the machine's operation takes place and racks 106, 107, are moved from one station to the next.

Also driven from shaft 351 is cross conveyor belt 322 by means comprising sprocket 548 mounted on shaft 351, sprocket 550 mounted on right angle gear reducer 551, chain 549 connecting sprockets 548 and 550 (Figure 7A), sprocket 552 mounted on and driven by right angle gear reducer 551, sprocket 328 mounted on shaft 327 extending from pulley 324, and chain 553 connecting sprockets 552 and 328 (Figure 13).

The package feeding mechanism is driven by means comprising sprocket 346 mounted between sprocket 345 and cam 510 on shaft 344, sprocket 353 rigidly mounted on counter shaft 349, chain 350 connecting sprocket 346 and sprocket 353 (Figures 2, 7, and 14), arm 371 mounted on one end of shaft 349, oscillating cam 374 pivotally mounted on shaft 376, connecting rod 373 engaging arm 371 by means of shoulder bolt 372 and engaging oscillating cam 374 by means of shoulder bolt 375, inverted T arm 377 pivotally mounted on shoulder bolt 382 attached to frame 1, vertical arm 378 pivotally mounted to one end of T arm 377 by shoulder bolt 381 and adapted to actuate ratchet wheel 390 mounted on shaft 391, vertical arm 380 pivotally mounted by shoulder bolt 383 on T arm 377 opposite vertical arm 378.

Vertical arms 378 and 380 are actuated vertically and vertical extension 379 of T arm 377 is actuated pivotally from pivot bolt 382 by means of curved slot 384 in cam 374, roller 385 mounted in substantially triangular extension 386 of vertical extension 379, said roller being adapted to move within said slot 384. One end of horizontal arm 393 is pivotally mounted by bolt 394 on the upper end of vertical extension 379 and the opposite end thereof is adapted to pivotally engage link 396 by bolt 395 and to actuate said link 396 which is pivotally mounted on pin 397 and which comprises a part of a conventional package lifting device incorporated in the machine.

Another part of said package lifting device is actuated by means of rocker arm 388 rigidly mounted on shaft 389, in one end of which rocker arm is mounted roller 387 adapted to ride on the upper peripheral surface of cam 374.

Ratchet wheel 390 is mounted on one end of shaft 391 which carries on the opposite end thereof worm gear 392 (Figure 5) adapted to engage gear 399 mounted on transverse shaft 398 on the opposite end of which is mounted sprocket 412 (Figure 2) connected by chain 415 to sprocket 413 mounted on shaft 414 mounted in bearings 418, chain 415 passing over idler sprocket 416 mounted on pin 417 through a bracket on frame 1.

Sprocket 420 is mounted on one end of shaft 414 and is connected by chain 423 with sprocket 424 mounted on shaft 426 (Figure 5) upon which shaft is mounted pulley 430 (Figure 2) carrying conveyor belt 20.

Sprocket 419 is mounted inwardly from sprocket 420 on shaft 414 and is connected by chain 421 with sprocket 422 mounted on shaft 425 in bearing 431 at the receiving end of the machine (Figure 5). Pulley 427 carrying conveyor belt 19 is mounted on shaft 425 and is driven thereby (Figure 2).

Conventional take-up mechanism 435 is provided for conveyor belt 19 and take-up mechanism 434 is provided for conveyor belt 20 (Figure 2).

Vacuum and air pressure are provided for the receptacle feeding mechanism by means of a conventional vacuum and pressure pump 407 driven by belt 411 from motor 410 mounted on a lower portion of frame 1 (Figure 5). Suction line 403 extends vertically from pump 407 through enlarged pipe extension 406 to suction fingers 408 mounted on shaft 389. Pressure air line 404 extends vertically from pump 407 to vents in pipe stop member 409 adjacent stacked empty receptacles on the discharge end of belt 20 and beneath suction fingers 408 (Figure 1).

The vacuum in line 403 is controlled by a conventional valve actuated by L-shaped lever 401 pivotally mounted on shoulder bolt 405 and actuated by vertical arm 380 pivotally connected thereto by pin 402. Slot 400 in vertical arm 380 is adapted to provide delayed operation of lever 401. Closing of the suction valve in line 403 automatically stops the air pressure in line 404.

Conveyor belt 21 is driven by means of chain 367 passing around sprocket 361 mounted on shaft 349 and sprocket 362 mounted on shaft 363 on which pulley 368 is mounted. Chain 367 also passes around sprocket 369 mounted on shaft 366 adjacent sprocket 362 and on which shaft roller 27 is mounted (Figures 2, 7, and 7A). Idler sprocket 364 on shaft 365 is provided for the take-up of chain 367 (Figure 7A).

Blade 89 is actuated by means comprising box cam 510 (Figure 15) mounted by key 511 on the approximate center of main countershaft 344, groove 512 in said box cam, cam roller 513 mounted by pin 514 to arm 515 and adapted to operate in track or groove 512 of cam 510 (Figure 15), rocker arm 515 rigidly mounted by key 516 on rocker shaft 456 (Figure 14) mounted in bearings 465 attached to frame 1 by bolts 467, rocker arms 517 rigidly mounted by keys 518 on the ends of rocker shaft 456, boss members 519 pivotally mounted on the end of arms 517 by pins 520, boss members 521 pivotally mounted on pins 520 adjacent members 519 and threaded to receive connecting rods 522 held in adjusted position by lock nuts 523 (Figure 14). Connecting rods 522 are adapted to actuate blade 89 as heretofore described.

Compressed air is delivered to manifolds 8 and 8a through metal pipe 5 vertically mounted on one side of the machine (Figure 2) by means of Y extension member 6 having its legs threaded into T member 7 mounted by threads in the end of manifolds 8 and 8a opposite U member 11. T members 7 comprise metal pipe T members of usual construction and into the lower legs of which are screwed metal caps 228 through which a hole is drilled to receive vertically mounted stems 16.

As illustrated in Figure 3, valve seat 12 is screwed into the upper leg of each T member 7, on which is mounted gasket 13, adapted to receive valve head 14 rigidly mounted on the uppermost end of each stem 16. Coil spring 15 is disposed around stem 16 inside each T member 7 and is adapted to press head 14 into engagement with gasket 13. Stems 16 are actuated by chains 17 extending downward to holes 509 in bell crank arm 472 (Figure 7A) rigidly mounted to bearing 473 (Figure 6). Also mounted to bearing 473 is bell crank arm 471, said bearing 473 being pivotally mounted on pin 479 extending horizontally from frame 1.

Link 459 connects bell crank arm 471 by pivot pin 474 and bell crank arm 457 by pin 460. Bell crank arm 457 is pivotally mounted on shaft 456 (Figure 17) and carries on the lower end thereof cam roller 458 by pin 470, said cam roller being adapted to move in track 438 on the inside face of cam plate 436 mounted by key 437 on one end of counter shaft 344 (Figures 2 and 17). The periphery of cam 436 comprises flange 455. One revolution of cam plate 436 thus releases one blast of compressed air into manifolds 8 and 8a in timed relation to the presentation of receptacles 18 at stations B and C as heretofore described.

The top crimping and folding mechanism is lowered into operating position and is raised therefrom by means comprising connecting rods 242, heretofore described, mounted in clevises 245 and held in adjusted position by lock nut 246, clevises 245 pivotally mounted by pins 247 to rocker arms 248 and 506 (Figure 19) mounted by keys 507 and 508 to quill 251 mounted in bearings 499 attached to the sides of frame 1 (Figures 2, 5, and 7).

Rocker arm 248 is actuated by connecting rod 464 pivotally mounted thereto by clevis 475, lock nut 478, and pin 477. Rod 464 is actuated by horizontal bell crank arm 469 to which said rod is pivotally mounted by clevis 462, lock nut 463, and pin 461. Horizontal bell crank arm 469 is pivotally mounted on shaft 456 and is actuated by vertical bell crank arm 457 and cam 436 heretofore described (Figure 17).

Pivotal crimping rack 268 (Figure 18) is actuated by means of connecting rods 274 pivotally mounted by clevises 495, lock nuts 501, and pins 496 to rocker arms 494 and 504 mounted by pins 503 and 505 to shaft 497 which is adapted to rotate inside quill 251.

As illustrated by Figure 18, rocker arm 494 is actuated by connecting rod 487 pivotally mounted thereto by clevis 491, lock nut 492, and pin 493, said rod 487 being pivotally mounted by clevis 488, lock nut 490 and pin 489 to bell crank 486 pivotally mounted upon shaft 456 and actuated by depending bell crank arm 485 mounted by cam roller 483 and pin 484 in track 482 of cam plate 480 mounted by key 481 on shaft 344 adjacent sprocket 347.

Shaft 301, on which are mounted arms 304 at the discharge end of the machine, is actuated by means comprising sprocket 310 mounted on one end of said shaft 301 (Figure 7A), chain 229 connecting sprocket 310 with the outside member of double sprockets 452 mounted on stud shaft 453 fastened to frame 1, the inside member of double sprockets 452 being adapted to engage the outside of chain 454 connecting sprocket 318 mounted on shaft 317 and driving sprocket 451 mounted on shaft 124 actuated by ratchet wheel 447 heretofore described (Figures 6 and 7A).

Conveyor belt 315 is driven by pulley 316 mounted on shaft 317 actuated by sprocket 318 heretofore described (Figures 6 and 7A).

While I have shown the preferred form of my invention as now known to me, I wish it understood that various changes may be made in its construction without departing from the spirit of the invention as defined in the appended claims.

Having thus described my invention, what I claim and desire to secure by Letters Patent is:

1. In a packaging machine of the character described, the combination of means for holding and crimping simultaneously the bottom ends of a plurality of joined paper receptacles, means for opening said receptacles and maintaining the same in opened condition during the filling thereof, and means for closing and crimping the top ends of said receptacles after the same have been filled.

2. In a packaging machine of the character described, the combination of means for crimping and holding simultaneously a plurality of joined paper receptacles and carrying the same intermittently through a plurality of operating stations, means for opening said receptacles and maintaining the same in opened condition during the filling thereof, and means for closing and crimping the top ends of said receptacles after the same have been filled.

3. In a packaging machine of the character described, the combination of means for folding and crimping simultaneously the bottom ends of a plurality of joined paper receptacles, means for holding said receptacles in substantially vertical position and carrying the same intermittently through a plurality of operating stations, and means for closing and crimping the top ends of said receptacles after the same have been filled.

4. In a packaging machine of the character described, the combination of means for folding and crimping simultaneously the bottom ends of a plurality of joined paper receptacles, means for holding said receptacles in substantially vertical position and carrying the same intermittently through a plurality of operating stations, and means for opening said receptacles and maintaining the same in opened condition during the filling thereof.

5. In a packaging machine of the character described, the combination of means for folding and crimping the bottom ends of a plurality of joined paper receptacles simultaneously, means for holding said receptacles in substantially vertical position and carrying the same intermittently through a plurality of operating stations, means for opening said receptacles and maintaining the same in opened condition during the filling thereof, and means for closing and crimping the top ends of said receptacles after the same have been filled.

6. In a packaging machine of the character described, the combination of means for feeding a plurality of joined paper receptacles, means for closing the bottom ends thereof, means for holding said receptacles in substantially vertical position and carrying the same through a plurality of operating stations, means for opening said receptacles and maintaining the same in opened condition during the filling thereof, and means for closing the top ends of said receptacles after the same have been filled.

7. In a packaging machine of the character described, the combination of means for intermittently feeding a plurality of joined paper receptacles, means for folding and crimping the bottom ends thereof, means for holding said receptacles in substantially vertical position and carrying the same intermittently through a plurality of operating stations, means for opening said receptacles and maintaining the same in opened condition during the filling thereof, and means for closing and crimping the top ends of said receptacles after the same have been filled.

8. A packaging machine of the character described, comprising in combination, means for intermittently feeding a plurality of joined paper receptacles, means for folding and crimping the bottom ends thereof, means for holding said receptacles in substantially vertical position and carrying the same intermittently through a plurality of operating stations, means for opening said receptacles and maintaining the same in opened condition during the filling thereof, means for depositing in said receptacles simultaneously a plurality of articles in alignment, and means for closing and crimping the top ends of said receptacles after the same have been filled.

9. The combination with a package feeding mechanism and means for depositing articles in said packages, of a plurality of mated racks oppositely disposed in pairs and mounted transversely in predetermined spaced relation on parallel sprocket chains, said mated racks being adapted to crimp and hold the bottom ends of said packages and to carry said packages through a plurality of operating stations.

10. The combination with a package feeding mechanism and means for depositing articles in said packages, of a plurality of mated racks oppositely disposed in pairs and mounted transversely in predetermined spaced relation on parallel sprocket chains, said mated racks being adapted to receive, crimp, and hold the bottom ends of said packages and to carry said packages through a plurality of operating stations, and a folding blade mounted in superimposed parallel relation to said mated racks, means to support said blade for vertical movement into and out of the space between each pair of said racks at a predetermined operating station of said machine, and means to control the position of said mated racks during the down stroke of said blade whereby said blade is in register with the space between said racks.

11. The combination with a package feeding mechanism and means for depositing articles in said packages, of a plurality of mated racks oppositely disposed in pairs and mounted transversely in predetermined spaced relation on parallel sprocket chains, said mated racks being adapted to crimp and hold the bottom ends of said packages and to carry said packages through a plurality of operating stations, and a plurality of package supporting flap members pivotally mounted on the rear member of each pair of said racks, and means for actuating said flap members in timed relation to the movement of said racks.

12. The combination with a mechanism for feeding sheets of joined paper packages and means for depositing articles in said packages, of a plurality of coacting flap members rotatably mounted in superimposed parallel relation to the package holding and conveying means and adapted to yieldingly support said packages when empty and during the opening thereof, and a pivotally mounted flap member extending in parallel relation to the package holding and conveying means and adapted to yieldingly support said packages during the deposit of articles therein, a plurality of projections mounted on the horizontal portion of said flap member in predetermined spaced relation coinciding with the position of the seams between said joined packages and adapted to supportingly engage the same.

13. The combination with a mechanism for feeding sheets of joined paper receptacles and means for depositing articles in said receptacles, of means to control the deposit of said articles in timed relation to the advance of each sheet of receptacles to the place of deposit, and means to yieldingly support the walls of said receptacles during the opening, filling and closing thereof.

14. In a packaging machine of the character described, the combination of means for folding and crimping the bottom ends of a plurality of joined paper receptacles simultaneously, means for holding said receptacles in substantially vertical position and carrying the same intermittently through a plurality of operating stations, means for opening said receptacles and maintaining the same in opened condition during the filling thereof, and means for closing and crimping the top ends of said receptacles after the same have been filled, and actuating means for driving all of said mechanism in predetermined cooperative relation.

15. A method of the character described, comprising folding and crimping the bottom ends of joined paper tubes, maintaining the pressure of the crimping means and utilizing the same to hold said paper tubes in position for the reception of articles, then placing the articles in the tubes and closing and crimping the open ends thereof before releasing the first crimping means.

WILLIAM S. CLOUD.